(12) United States Patent
Everitt et al.

(10) Patent No.: US 10,365,807 B2
(45) Date of Patent: Jul. 30, 2019

(54) CONTROL OF SYSTEM ZOOM MAGNIFICATION USING A ROTATABLE INPUT MECHANISM

(71) Applicant: Apple Inc., Cupertino, CA (US)

(72) Inventors: Aaron Everitt, Cupertino, CA (US); Christopher B. Fleizach, Morgan Hill, CA (US); Gregory F. Hughes, San Jose, CA (US); Eric T. Seymour, San Jose, CA (US); Eric Lance Wilson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 410 days.

(21) Appl. No.: 14/841,646

(22) Filed: Aug. 31, 2015

(65) Prior Publication Data

US 2016/0259530 A1 Sep. 8, 2016

Related U.S. Application Data

(60) Provisional application No. 62/177,001, filed on Mar. 2, 2015.

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0354* (2013.01); *G06F 3/0362* (2013.01);
(Continued)

(58) Field of Classification Search
CPC ............................ G06F 3/04845; G06F 3/0354
See application file for complete search history.

(56) References Cited

U.S. PATENT DOCUMENTS 5,297,110 A 3/1994 Ohira et al.
5,795,301 A 8/1998 Yasukawa et al.
(Continued)

FOREIGN PATENT DOCUMENTS

AU 2012200689 A1 3/2012
EP 1637969 A2 3/2006
(Continued)

OTHER PUBLICATIONS

International Preliminary Report on Patentability received for PCT Patent Application No. PCT/US2015/038161, dated Mar. 16, 2017, 9 pages.
(Continued)

*Primary Examiner* — Mahelet Shiberou
(74) *Attorney, Agent, or Firm* — Dentons US LLP

(57) ABSTRACT

An electronic device includes a touch-sensitive display, a rotatable input mechanism, one or more processors, and memory. The electronic device displays content on the display, where the content includes a first edge and a second edge opposite the first edge. The electronic device further detects a first user input, and in response to detecting the first user input, displays an enlarged view of the content that does not include the first edge. The electronic device further detects a rotation of the rotatable input mechanism in a first rotation direction, and in response to detecting the rotation, translates the enlarged view of the content in a first translation direction on the display to display the first edge of the content.

60 Claims, 19 Drawing Sheets

(51) Int. Cl.
*G06F 3/0354* (2013.01)
*G06F 3/0481* (2013.01)
*G06F 3/0488* (2013.01)
*G06F 3/0485* (2013.01)
*G06F 3/0362* (2013.01)

(52) U.S. Cl.
CPC .......... *G06F 3/0481* (2013.01); *G06F 3/0485* (2013.01); *G06F 3/04847* (2013.01); *G06F 3/04883* (2013.01); *G06F 2203/04803* (2013.01); *G06F 2203/04804* (2013.01); *G06F 2203/04806* (2013.01)

(56) References Cited

U.S. PATENT DOCUMENTS

| | | | | |
|---|---|---|---|---|
| 7,075,513 | B2* | 7/2006 | Silfverberg | G06F 1/1626 345/157 |
| 7,710,409 | B2* | 5/2010 | Robbin | G06F 1/1626 345/156 |
| 8,201,102 | B2* | 6/2012 | Lee | G06F 9/4443 345/629 |
| 8,365,090 | B2 | 1/2013 | Ording | |
| 9,020,538 | B1 | 4/2015 | White et al. | |
| 9,052,814 | B2 | 6/2015 | Ording | |
| 9,696,809 | B2* | 7/2017 | Temple | G06F 3/017 |
| 2001/0043514 | A1 | 11/2001 | Kita | |
| 2002/0118605 | A1 | 8/2002 | Born et al. | |
| 2003/0081507 | A1 | 5/2003 | Kitazawa | |
| 2004/0218472 | A1 | 11/2004 | Narayanaswami et al. | |
| 2005/0162423 | A1 | 7/2005 | Goggin | |
| 2006/0136173 | A1 | 6/2006 | Case, Jr. et al. | |
| 2008/0163116 | A1* | 7/2008 | Lee | G06F 3/0481 715/815 |
| 2008/0168349 | A1* | 7/2008 | Lamiraux | G06F 3/0482 715/702 |
| 2009/0046110 | A1* | 2/2009 | Sadler | G06F 3/048 345/660 |
| 2009/0070705 | A1* | 3/2009 | Ording | G06F 3/0485 715/784 |
| 2010/0064255 | A1 | 3/2010 | Rottler et al. | |
| 2010/0073692 | A1* | 3/2010 | Waltman | G06F 17/212 358/1.1 |
| 2010/0079500 | A1* | 4/2010 | O'Sullivan | G06F 3/03543 345/661 |
| 2010/0229130 | A1 | 9/2010 | Edge et al. | |
| 2011/0003665 | A1 | 1/2011 | Burton et al. | |
| 2011/0193878 | A1 | 8/2011 | Seo et al. | |
| 2011/0275940 | A1 | 11/2011 | Nims et al. | |
| 2012/0032988 | A1 | 2/2012 | Katayama | |
| 2012/0169776 | A1* | 7/2012 | Rissa | G06F 3/04883 345/676 |
| 2012/0236037 | A1* | 9/2012 | Lessing | G06F 3/017 345/661 |
| 2012/0304113 | A1* | 11/2012 | Patten | G06F 3/04883 715/800 |
| 2013/0326401 | A1 | 12/2013 | Van | |
| 2014/0172136 | A1 | 6/2014 | Ura | |
| 2014/0282132 | A1 | 9/2014 | Daly, IV | |
| 2014/0288680 | A1 | 9/2014 | Hoffman et al. | |
| 2014/0328147 | A1* | 11/2014 | Yang | G04G 17/04 368/69 |
| 2015/0234562 | A1* | 8/2015 | Ording | G06F 3/0485 715/784 |
| 2016/0062582 | A1 | 3/2016 | Wilson et al. | |
| 2016/0357420 | A1 | 12/2016 | Wilson et al. | |

FOREIGN PATENT DOCUMENTS

| | | |
|---|---|---|
| EP | 2360902 A2 | 8/2011 |
| TW | 200843452 A | 11/2008 |
| TW | 201421340 A | 6/2014 |
| WO | 03/021568 A1 | 3/2003 |
| WO | 2008/004772 A1 | 1/2008 |
| WO | 2008/030976 A2 | 3/2008 |
| WO | 2014/189197 A1 | 11/2014 |

OTHER PUBLICATIONS

International Search Report & Written Opinion received for PCT Patent Application No. PCT/US2016/031064, dated Aug. 8, 2016, 8 pages.
Office Action received for Danish Patent Application No. PA201570775, dated Aug. 23, 2016, 7 pages.
Office Action received for Danish Patent Application No. PA201570775, dated Mar. 28, 2017, 3 pages.
International Search Report and Written Opinion received for PCT Patent Application No. PCT/US2015/038161, dated Sep. 4, 2015, 12 pages.
International Search Report and Written Opinion received for PCT Patent Application No. PCT/US2015/054310, dated Jan. 20, 2016, 10 pages.
Office Action received for Taiwanese Patent Application No. 104133281.0, dated Mar. 30, 2017, 10 Pages (4 pages of English translation and 6 pages of official copy).
Office Action received for Danish Patent Application No. PA201570775, dated Mar. 21, 2016, 12 pages.
International Preliminary Report on Patentability received for PCT Patent Application No. PCT/US2015/054310, dated Sep. 14, 2017, 7 pages.
Non-Final Office Action received for U.S. Appl. No. 14/752,662, dated Sep. 8, 2017, 16 pages.
Office Action received for Taiwanese Patent Application No. 104133281.0, dated Sep. 1, 2016, 10 pages (4 pages of English Translation and 6 pages of Official Copy).
Office Action received for Danish Patent Application No. PA201570775, dated Oct. 25, 2017, 3 pages.
Notice of Allowance received for Taiwanese Patent Application No. 104133281, dated Mar. 31, 2018, 4 pages (1 page of English Translation and 3 pages of Official copy).
International Preliminary Report on Patentability received for PCT Patent Application No. PCT/US2016/031064, dated Dec. 14, 2017, 7 pages.
Non-Final Office Action received for U.S. Appl. No. 14/868,757, dated Dec. 19, 2017, 17 pages.
Decision to Grant received for European Patent Application No. 15782209.9, dated Feb. 14, 2019, 2 pages.
Advisory Action received for U.S. Appl. No. 14/868,757, dated Jan. 17, 2019, 5 pages.
Non-Final Office Action received for U.S. Appl. No. 14/752,662, dated Dec. 28, 2018, 16 pages.
Intention to Grant received for European Patent Application No. 15782209.9, dated Sep. 28, 2018, 8 pages.
Advisory Action received for U.S. Appl. No. 14/752,662, dated Oct. 5, 2018, 3 pages.
Final Office Action received for U.S. Appl. No. 14/752,662, dated Jun. 21, 2018, 15 pages.
Final Office Action received for U.S. Appl. No. 14/868,757, dated Sep. 20, 2018, 18 pages.
Office Action received for Taiwanese Patent Application No. 104107330, dated Sep. 17, 2018, 17 pages. (7 pages of English Translation and 10 pages of Official copy).

* cited by examiner

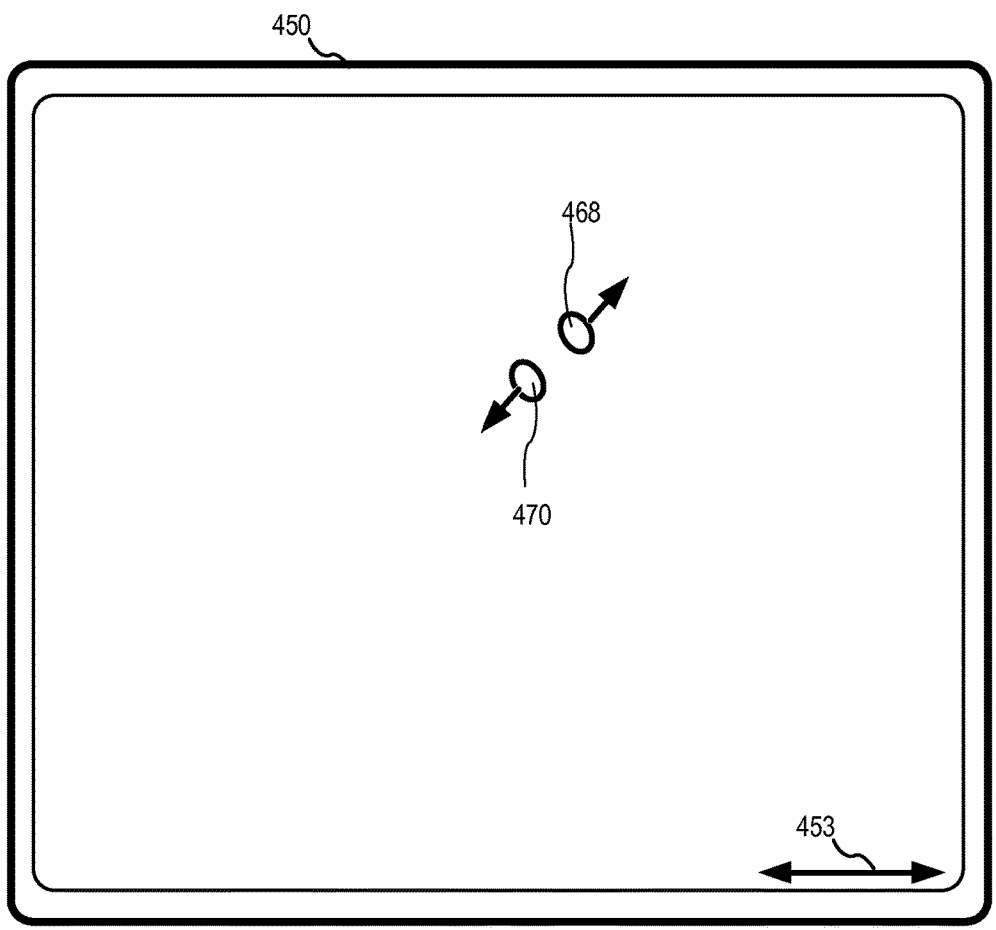
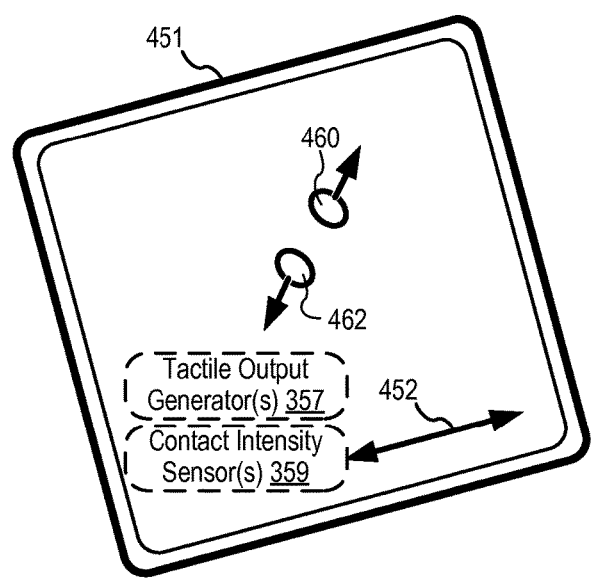
*FIG. 4B*

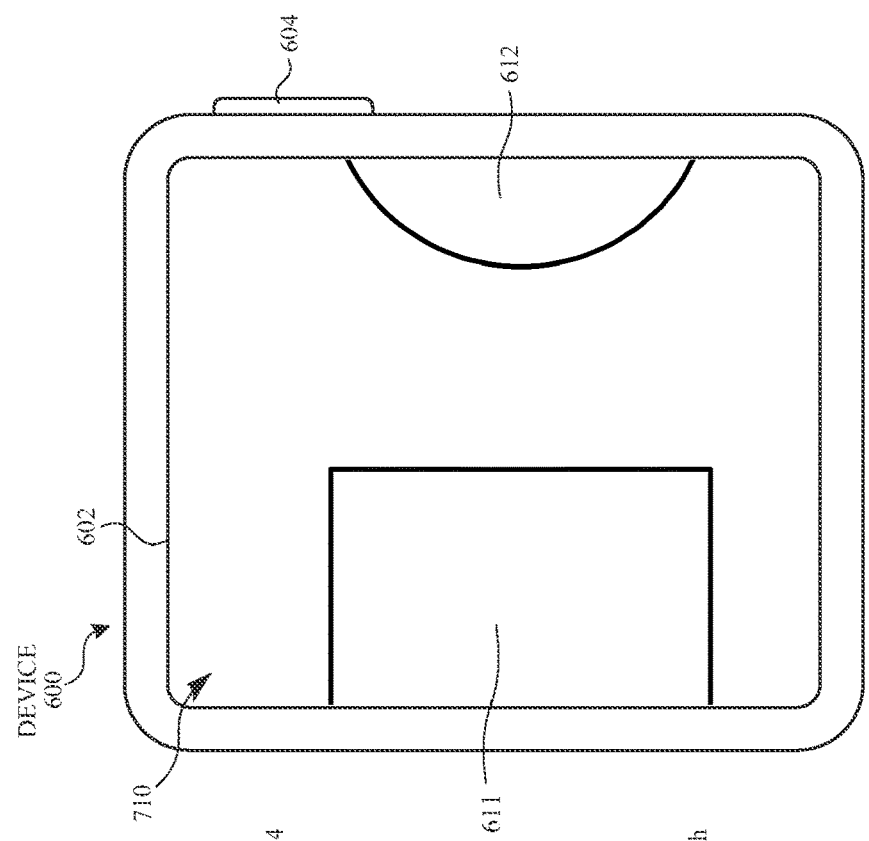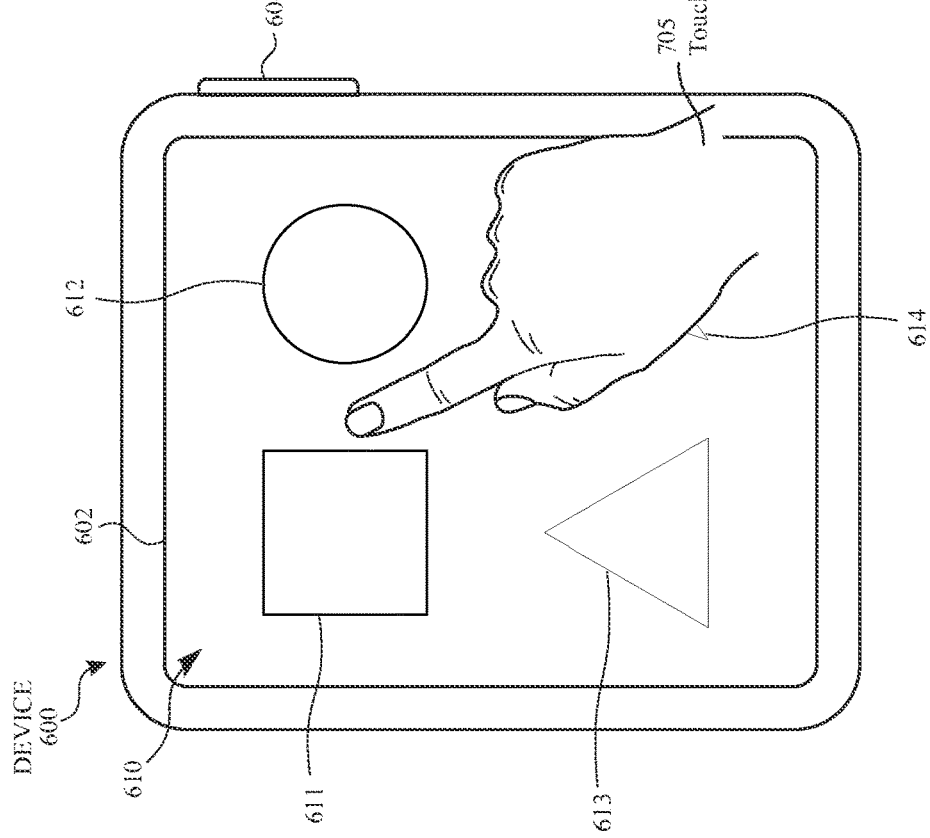

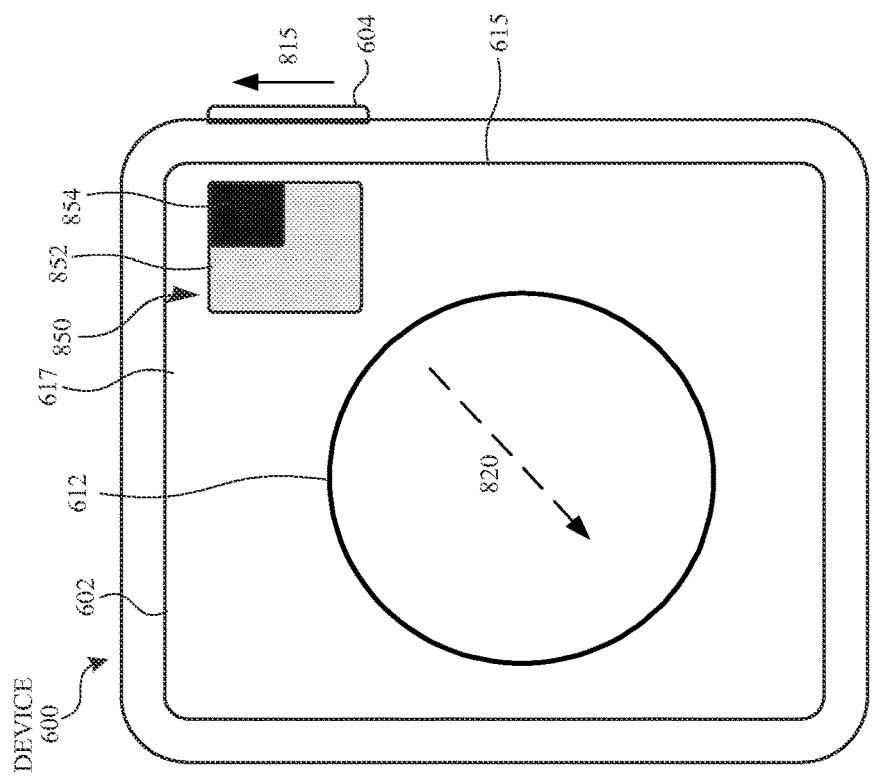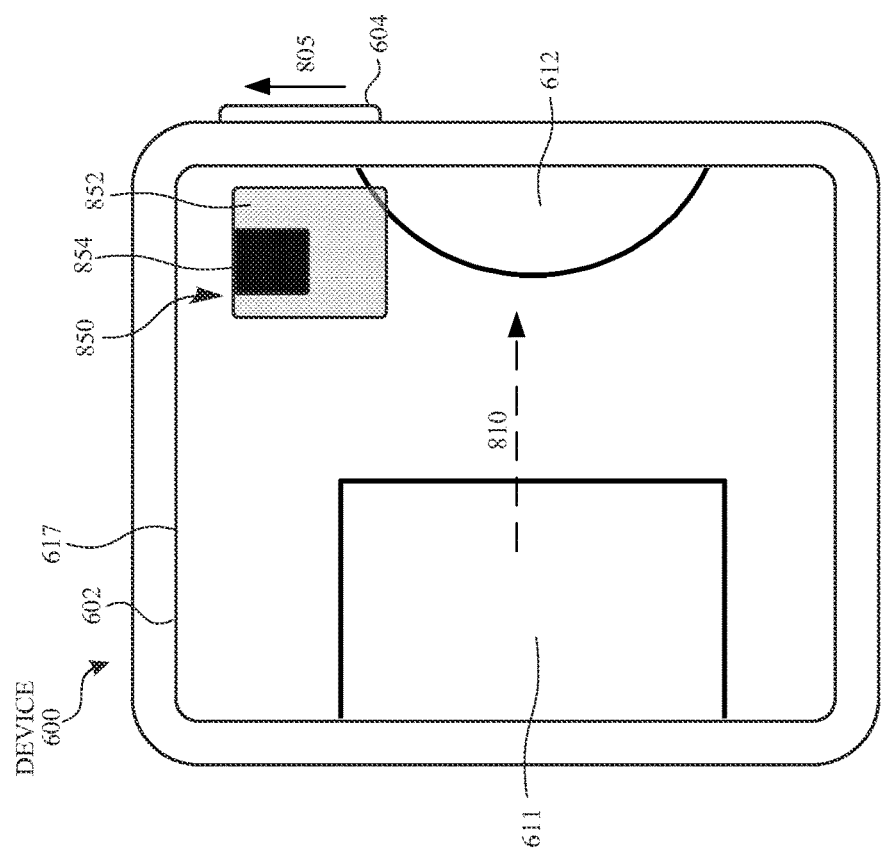

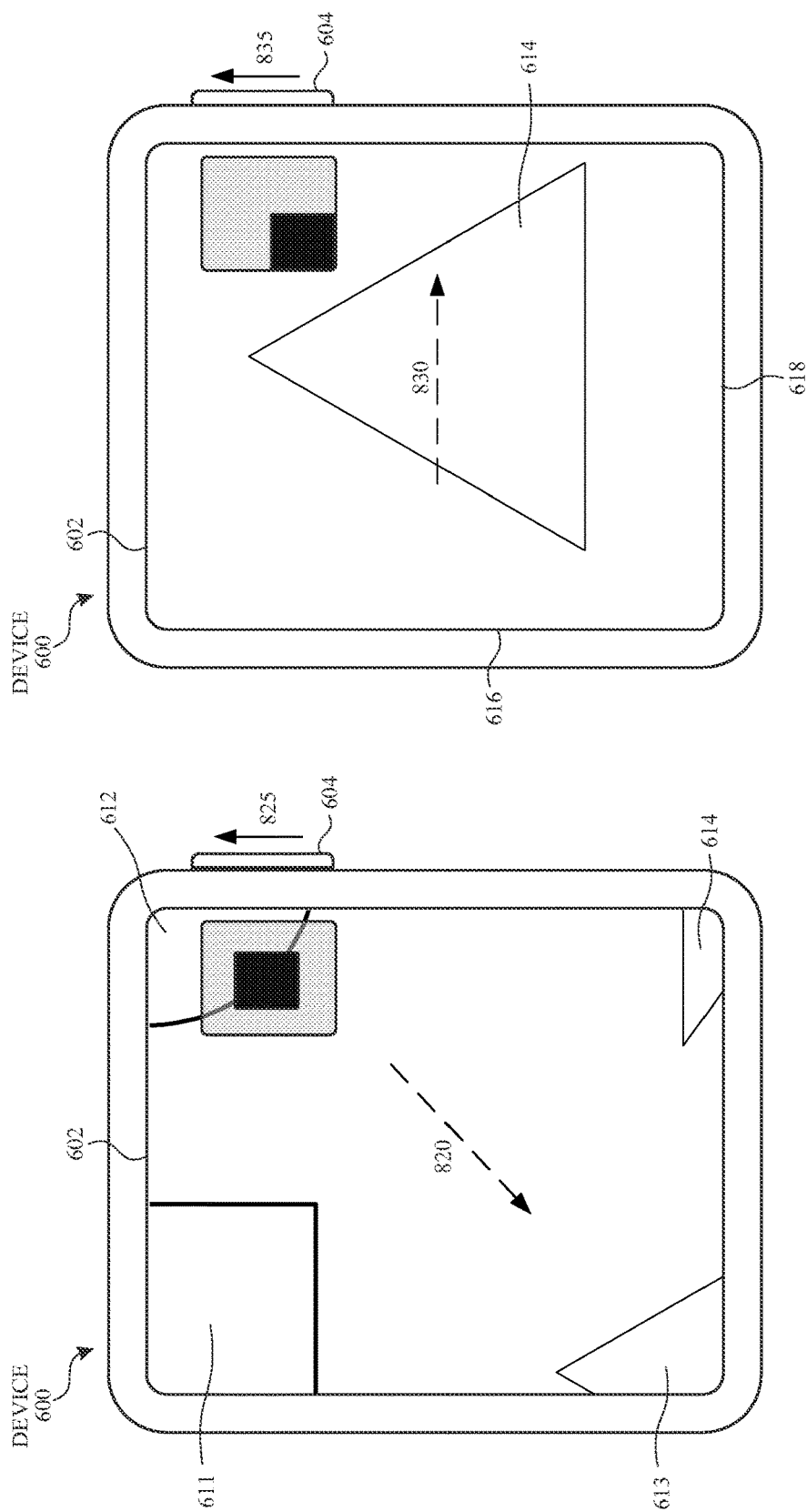

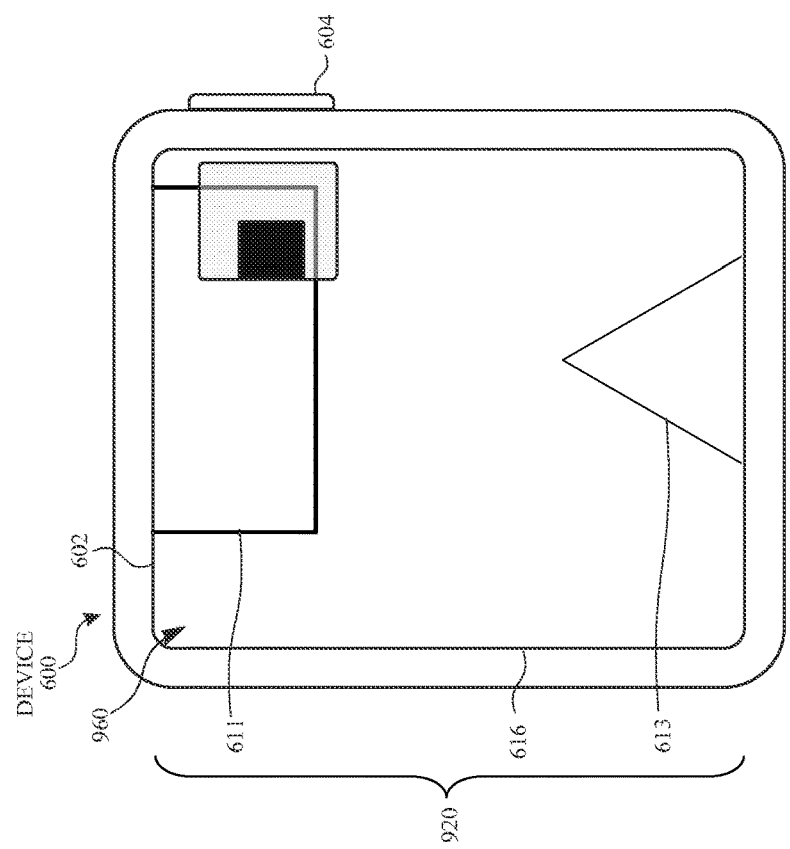
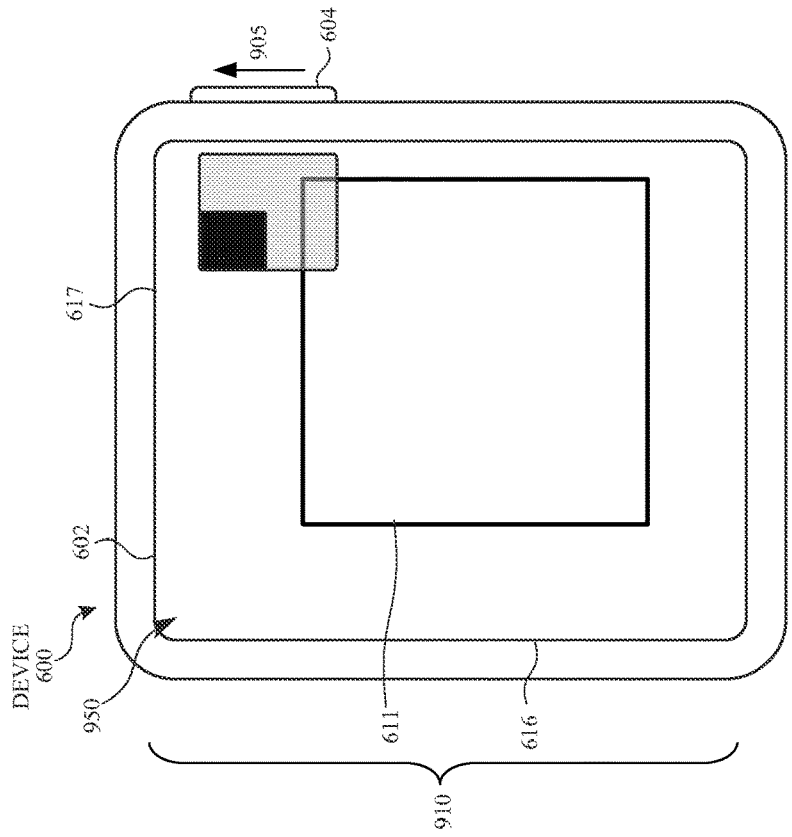

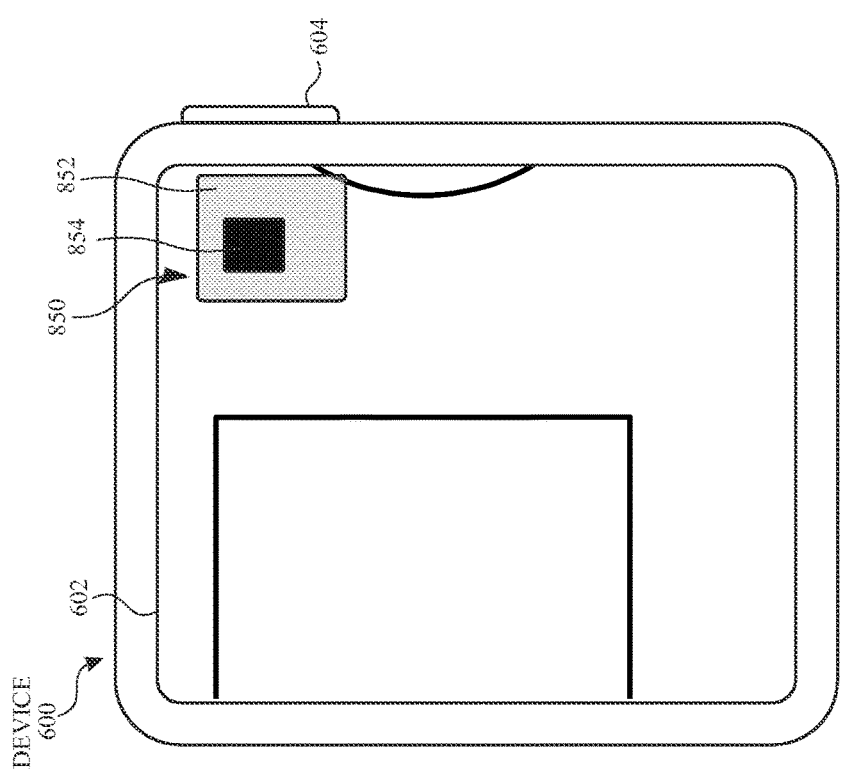
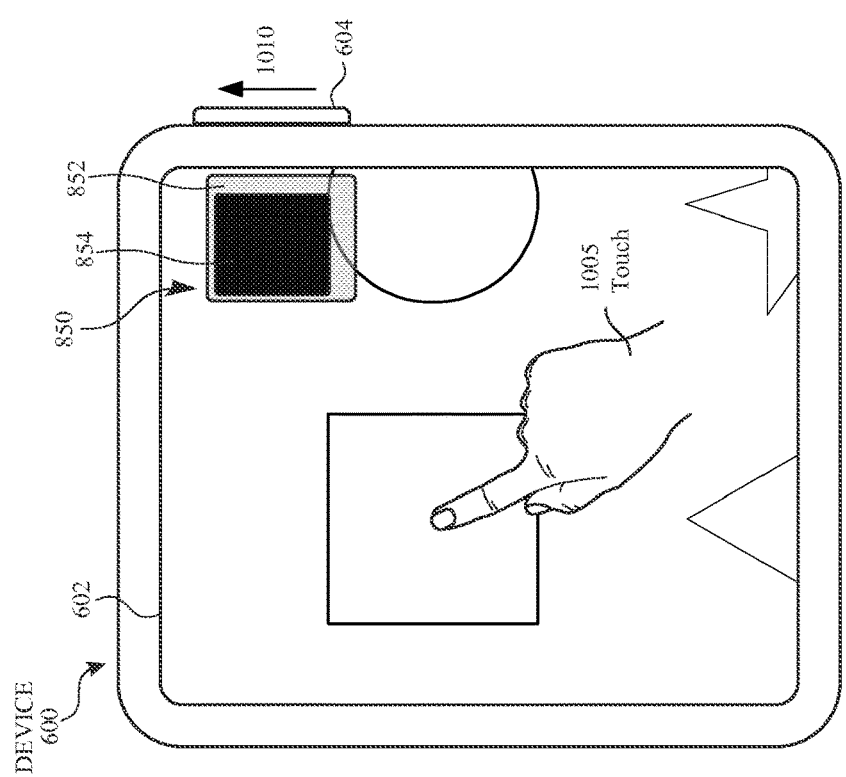

CONTROL OF SYSTEM ZOOM MAGNIFICATION USING A ROTATABLE INPUT MECHANISM

CROSS-REFERENCE TO RELATED APPLICATIONS

This application claims priority to U.S. Provisional Application No. 62/177,001, filed Mar. 2, 2015, the content of which is hereby incorporated by reference in its entirety.

FIELD

The present disclosure relates generally to computer user interfaces, and more specifically to techniques for displaying content.

BACKGROUND

As the technology of electronic devices advances, the form factor of many electronic devices is being reduced. For devices capable of displaying content, the display screens of these devices are also being decreased in size. Accordingly, there is a need for techniques for displaying content on reduced-size displays.

BRIEF SUMMARY

Some techniques for providing the ability to enlarge and navigate arbitrary content independent of the content displayed on a screen—at any time—is a crucial feature for modern operating systems. Existing systems allow zooming with either keyboard commands or multi-finger gestures. Limited size and lack of a keyboard make it a challenge to implement these solutions. It is desirable for a zoom solution to allow the ability to zoom in/out and pan around the enlarged content, and provide useful feedback (e.g., indicate what portion of the content is being displayed).

Some techniques for enlarging and navigating content using electronic devices, however, are generally cumbersome and inefficient. For example, existing techniques use a complex and time-consuming user interface, which may include multiple key presses or keystrokes. Existing techniques require more time than necessary, wasting user time and device energy. This latter consideration is particularly important in battery-operated devices.

Accordingly, there is a need for electronic devices with faster, more efficient methods and interfaces for enlarging and navigating displayed content. Such methods and interfaces optionally complement or replace other methods for displaying content. Such methods and interfaces reduce the cognitive burden on a user and produce a more efficient human-machine interface. For battery-operated computing devices, such methods and interfaces conserve power and increase the time between battery charges.

In accordance with some embodiments, a method is performed at an electronic device with a display, a rotatable input mechanism, one or more processors, and memory. The method includes: displaying content on the display, wherein the content includes a first edge and a second edge opposite the first edge; detecting a first user input; in response to detecting the first user input, displaying an enlarged view of the content that does not include the first edge; detecting a rotation of the rotatable input mechanism in a first rotation direction; and in response to detecting the rotation, translating the enlarged view of the content in a first translation direction on the display to display the first edge of the content.

In accordance with some embodiments, an electronic device includes a display unit configured to display a graphic user interface, a rotatable input unit configured to receive rotations, and a processing unit coupled to the display unit and the rotatable input unit. The processing unit is configured to enable display of content on the display unit, wherein the content includes a first edge and a second edge opposite the first edge; detect a first user input; in response to detecting the first user input, enable display of an enlarged view of the content that does not include the first edge; detect a rotation of the rotatable input unit in a first rotation direction; and in response to detecting the rotation, enable translation of the enlarged view of the content in a first translation direction on the display unit to display the first edge of the content.

In accordance with some embodiments, an electronic device includes a display, a rotatable input mechanism, optionally a touch-sensitive surface, one or more processors, memory, and one or more programs. The one or programs are stored in the memory and configured to be executed by the one or more processors. The one or more programs include instructions for performing the operations of the methods described above. In accordance with some embodiments, a computer-readable storage medium has stored therein instructions, which when executed by an electronic device with a display optionally a touch-sensitive surface, and a rotatable input mechanism, cause the device to perform the operation of the methods described above. In accordance with some embodiments, an electronic device includes a display, optionally a touch-sensitive surface, a rotatable input mechanism, and means for performing the operation of the methods described above.

Thus, devices are provided with faster, more efficient methods and interfaces for enlarging and navigating displayed content, thereby increasing the effectiveness, efficiency, and user satisfaction with such devices. Such methods and interfaces may complement or replace other methods for displaying content.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7B illustrate exemplary user interfaces and techniques for displaying content in accordance with some embodiments.

FIGS. 8A-8G illustrate exemplary user interfaces and techniques for displaying content in accordance with some embodiments.

FIGS. 9A-9C illustrate an exemplary user interface and technique for displaying content in accordance with some embodiments.

FIGS. 10A-10B illustrate an exemplary user interface and technique for displaying content in accordance with some embodiments.

DESCRIPTION OF EMBODIMENTS

Figure 1A:
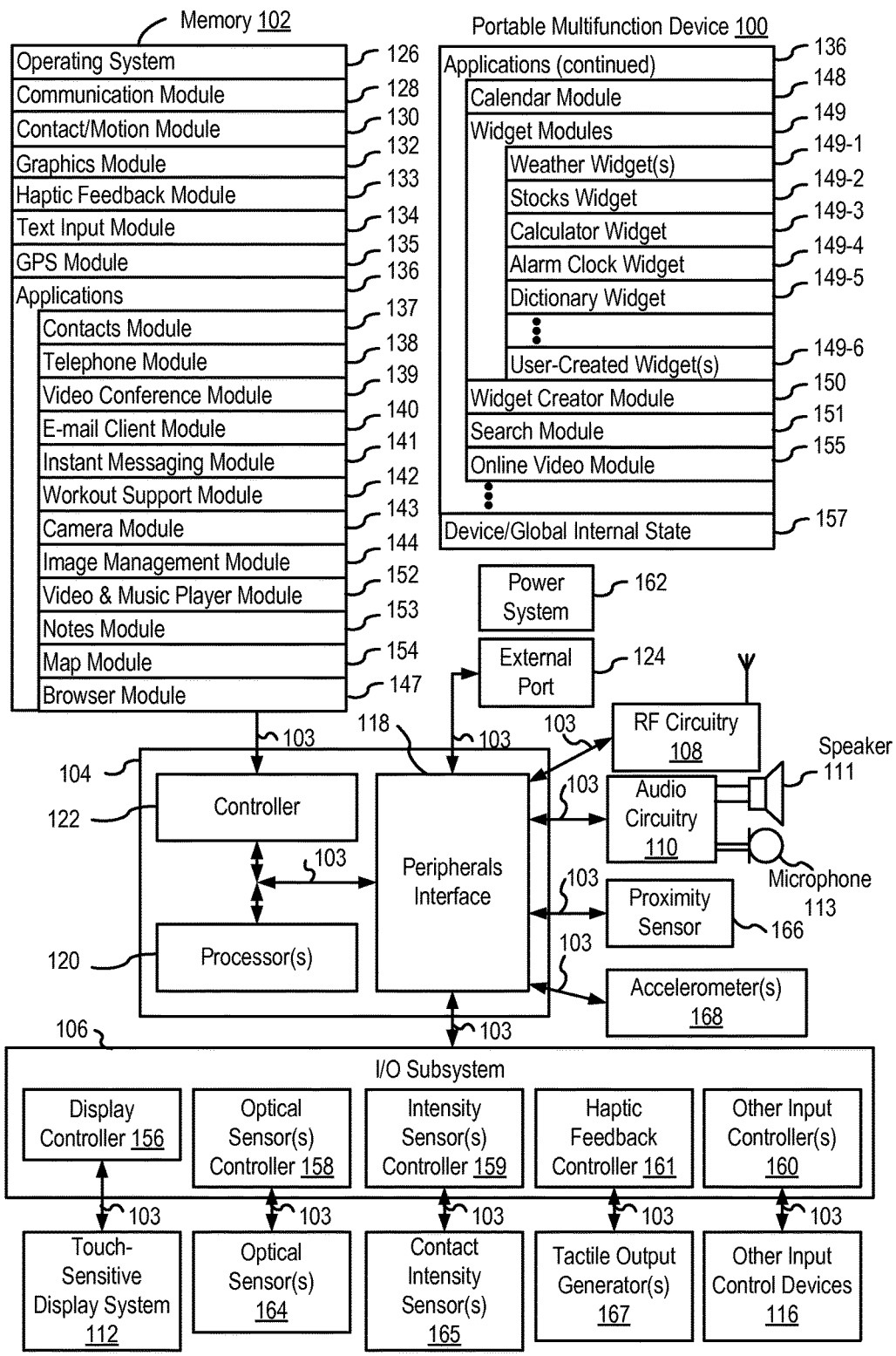
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for viewing content. Some modern electronic devices include a relatively small display. In order to efficiently view content on a small display, it may be advantageous to enlarge (e.g., magnify or zoom) displayed content and provide intuitive techniques for viewing and navigating portions of the content in the enlarged view (e.g., scanning from top left to bottom right). A rotatable input mechanism may be used to translate an enlarged view of content, which may allow a user to navigate to different portions of the content without touching the display and obscuring the user's view of the display. Such techniques can reduce the cognitive burden on a user who access content of a relatively small display, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for enlarging and viewing content. FIGS. 6-10B illustrate exemplary user interfaces for enlarging and viewing content. The user interfaces in the figures are also used to illustrate the processes described below, including the process in FIG. 11.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106.

Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
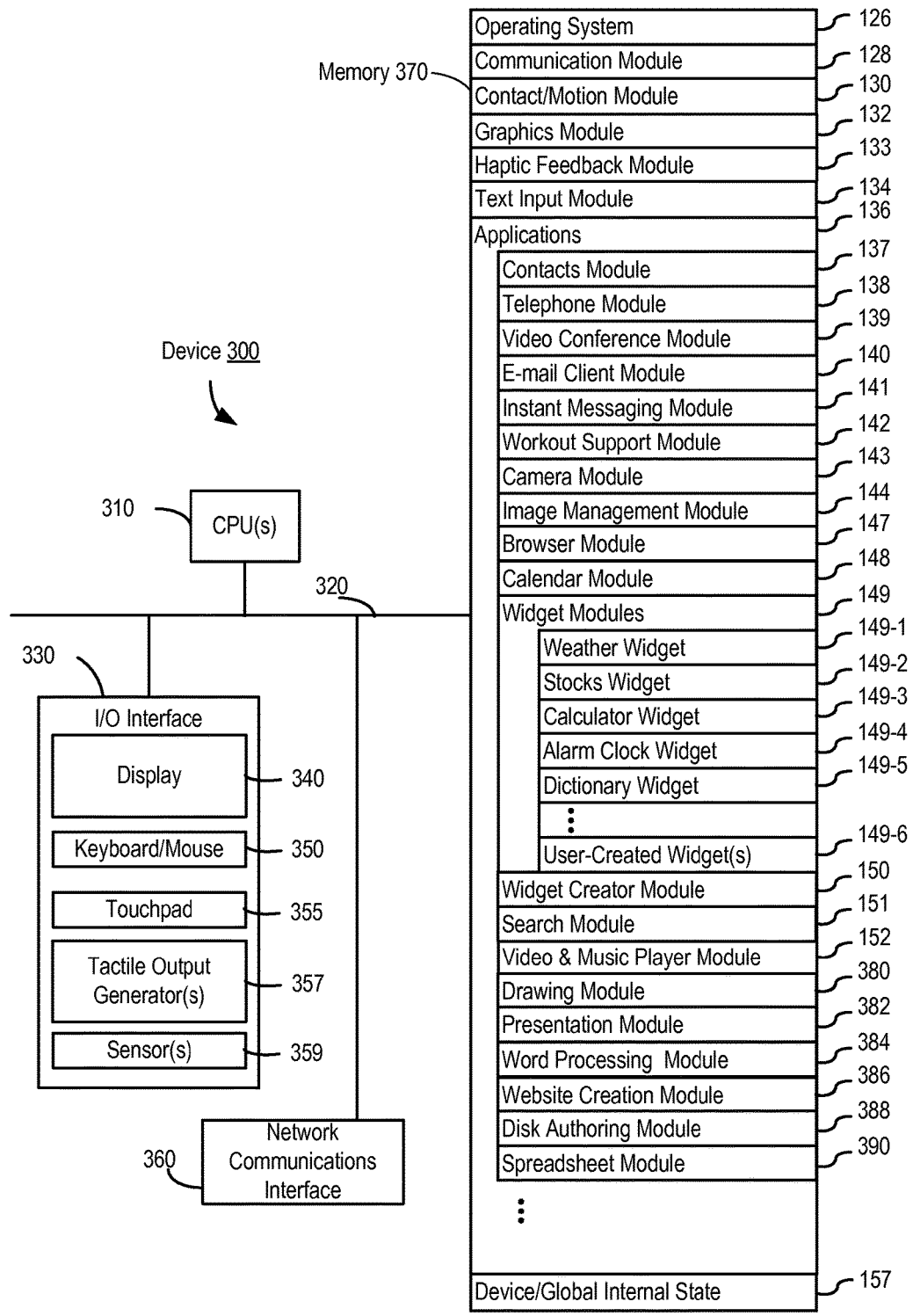
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
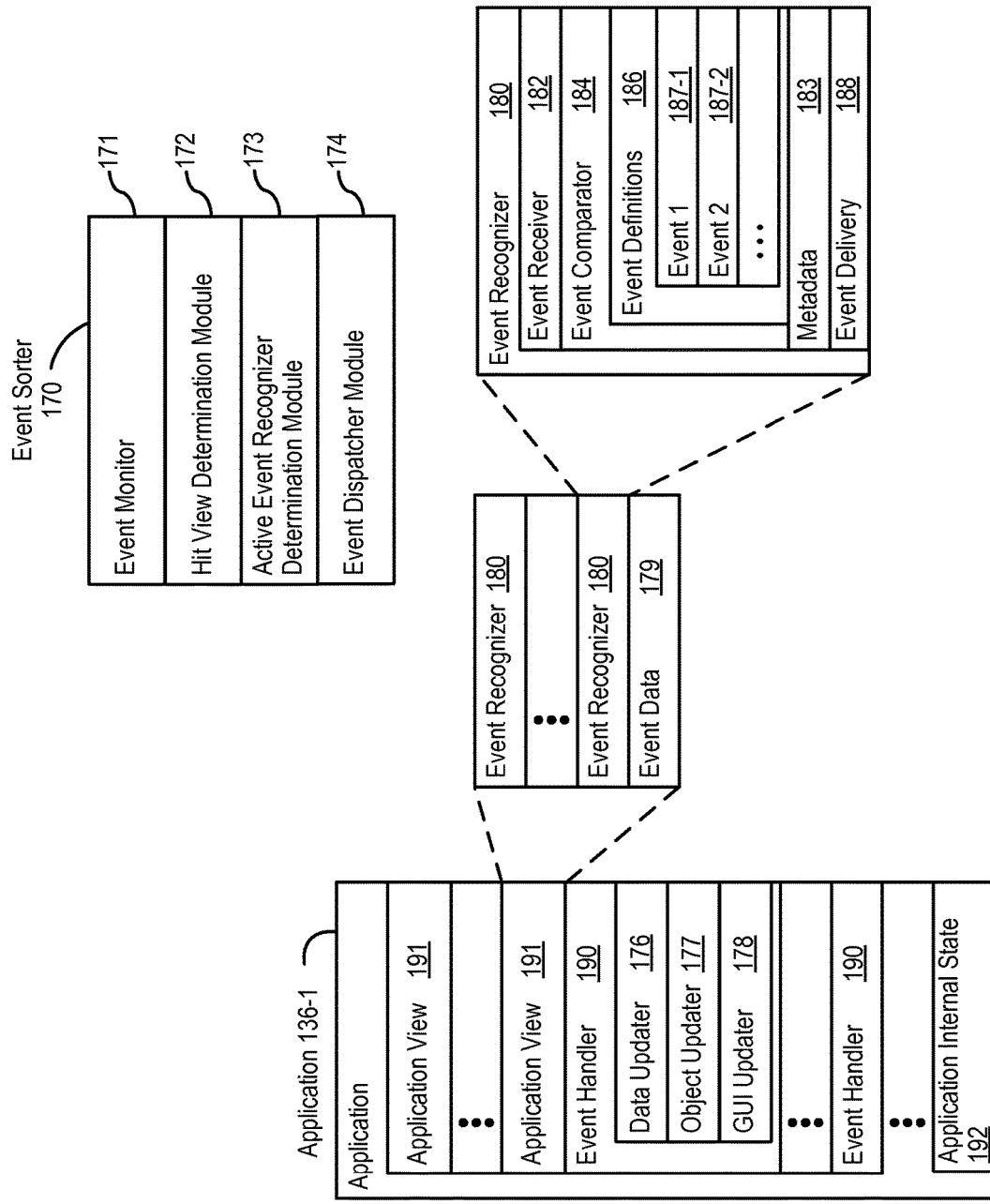
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
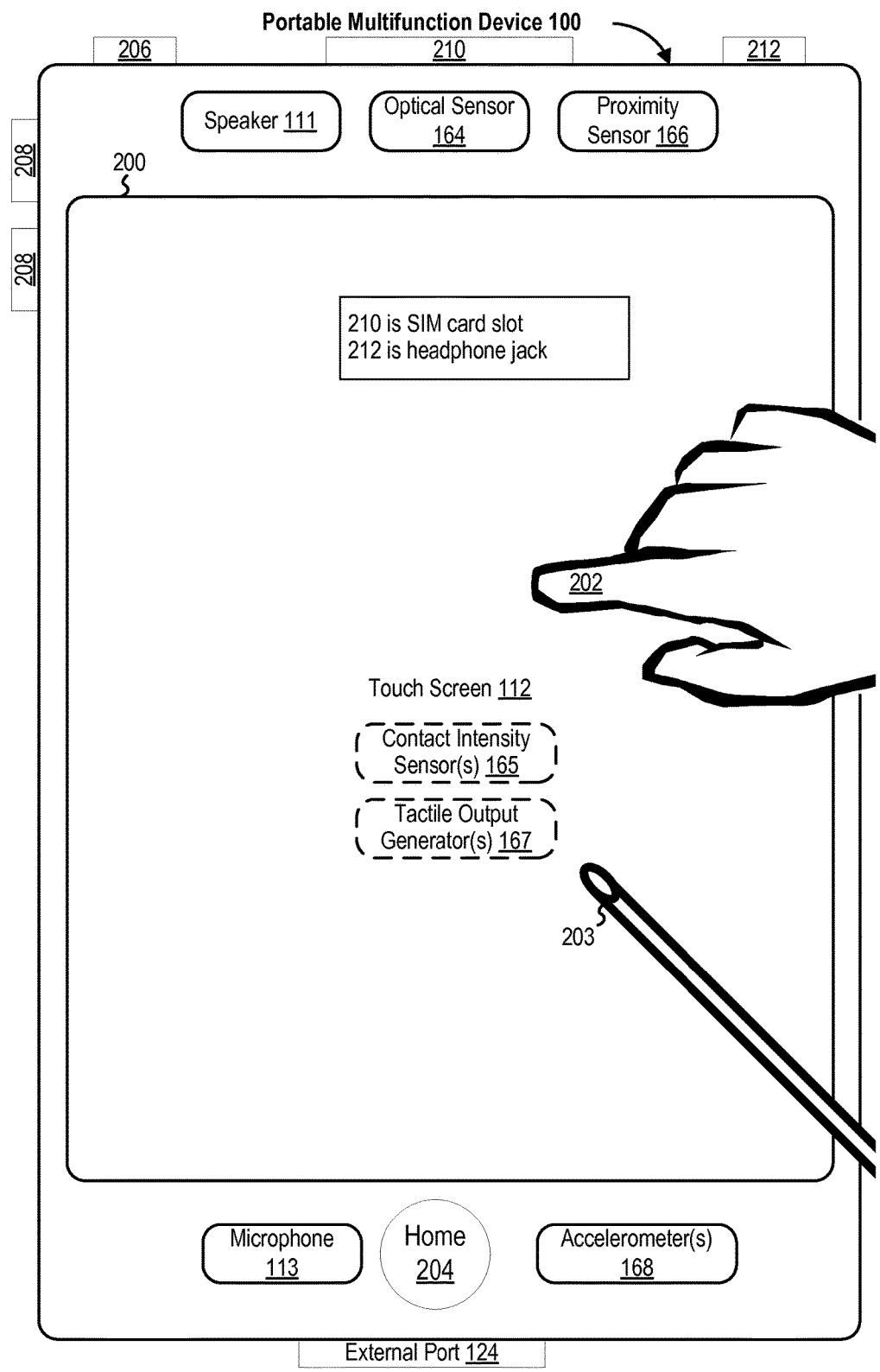
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
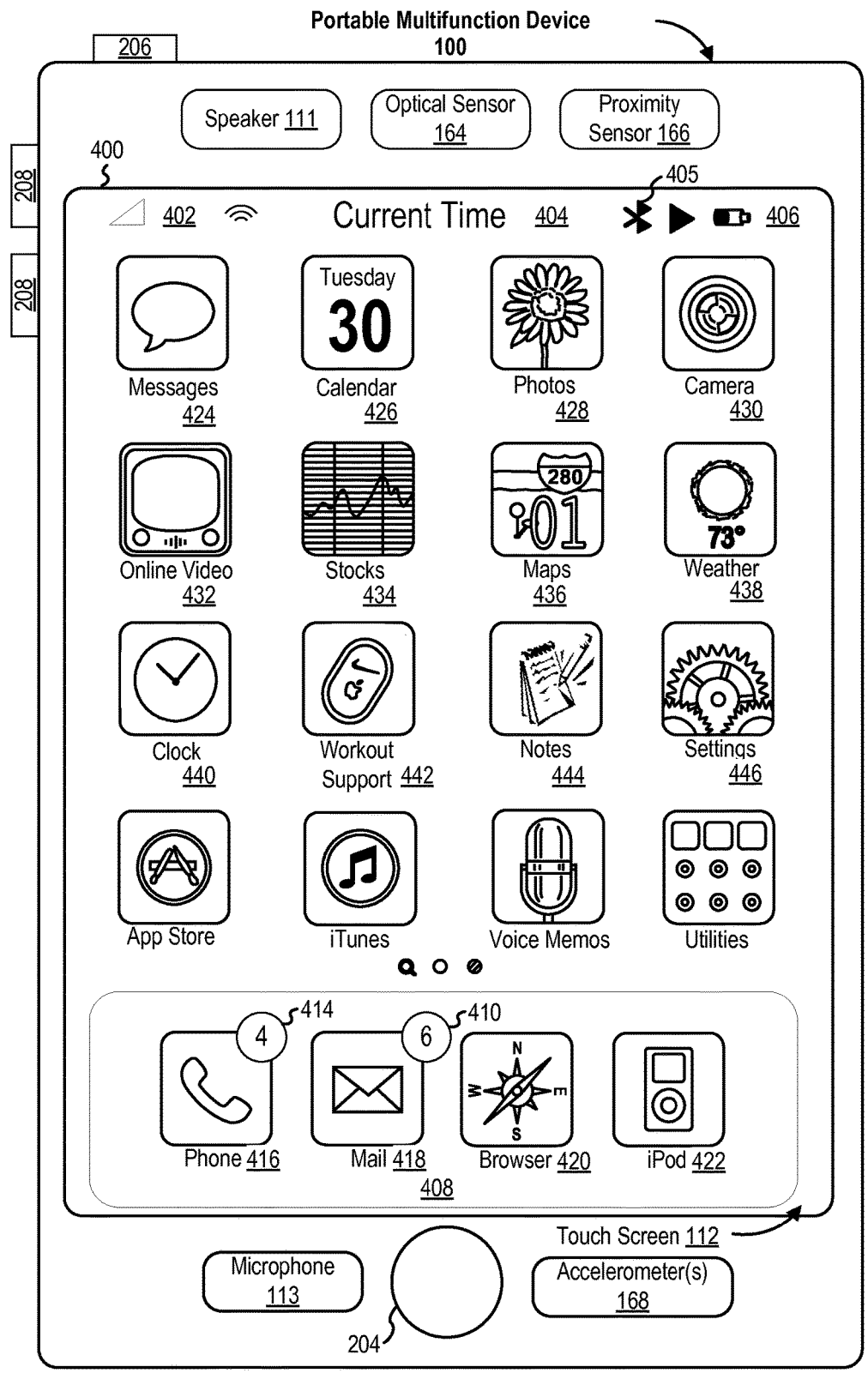
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
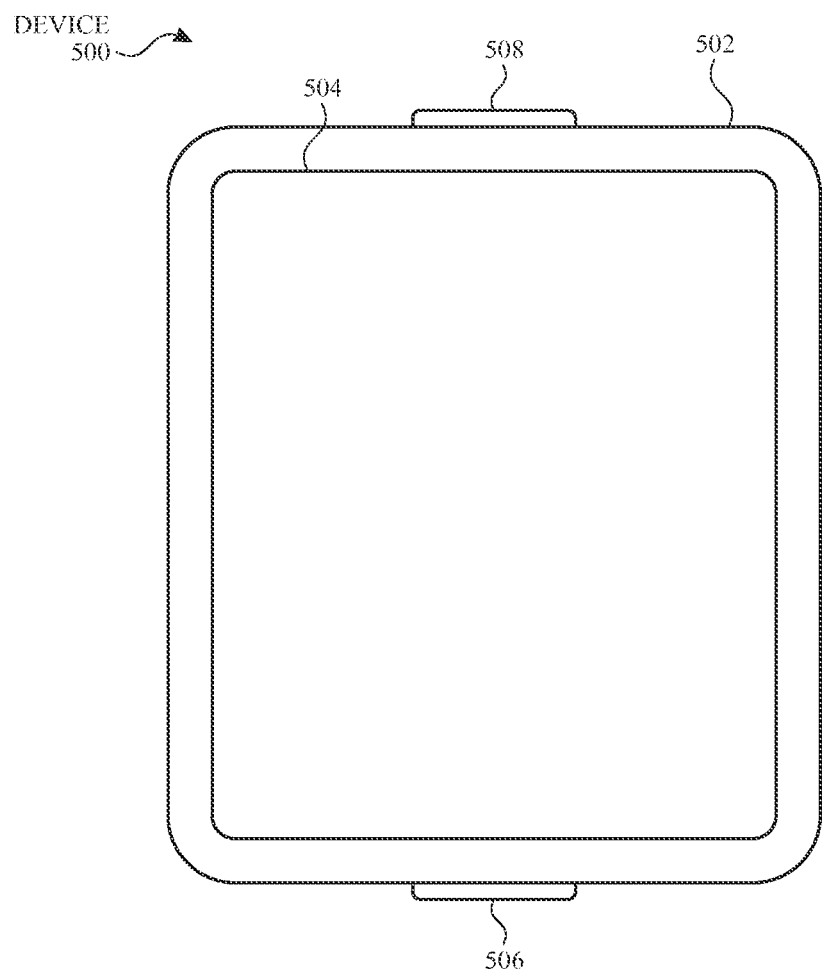
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
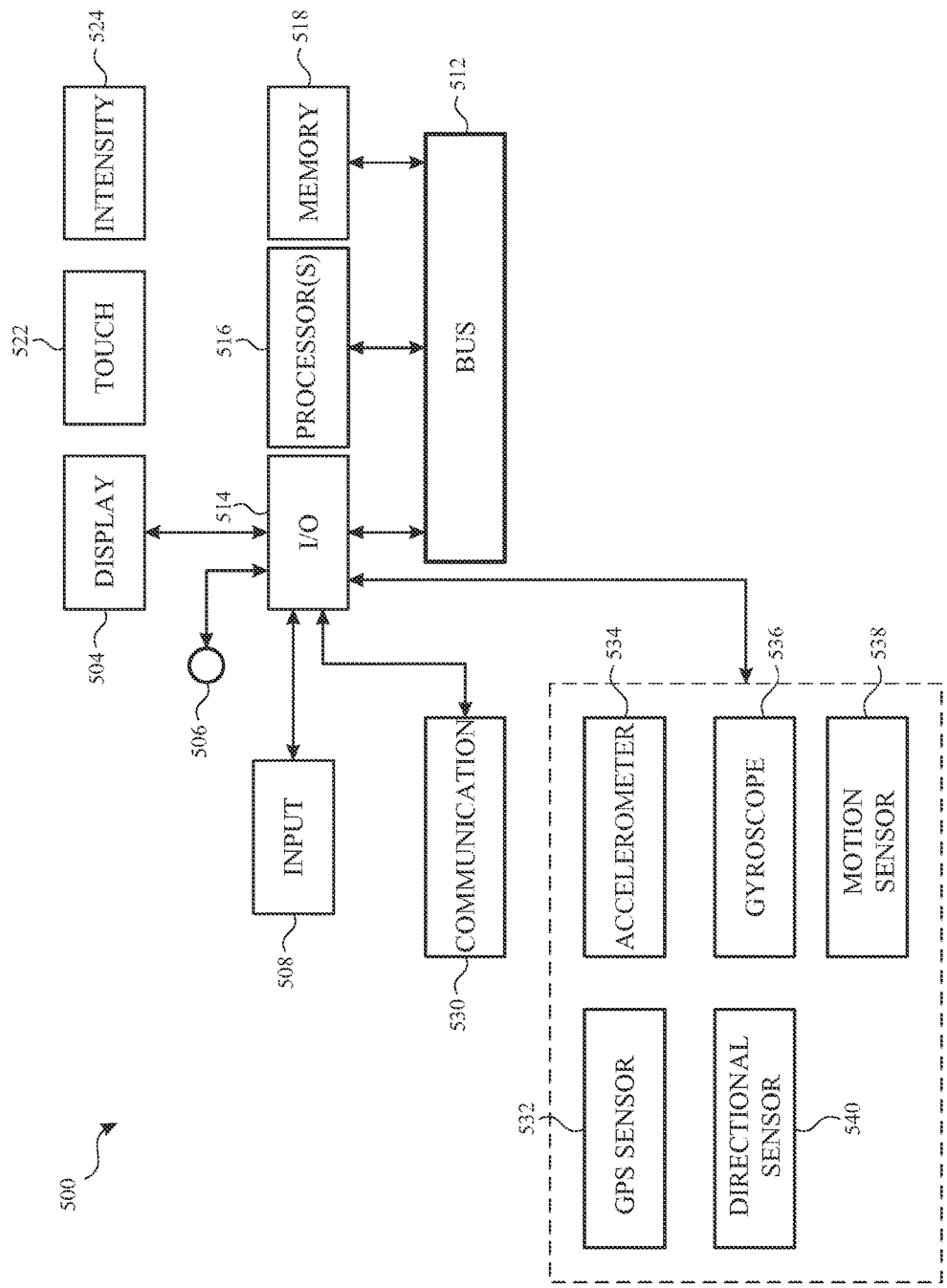
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including process 1100 (FIG. 11). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6:
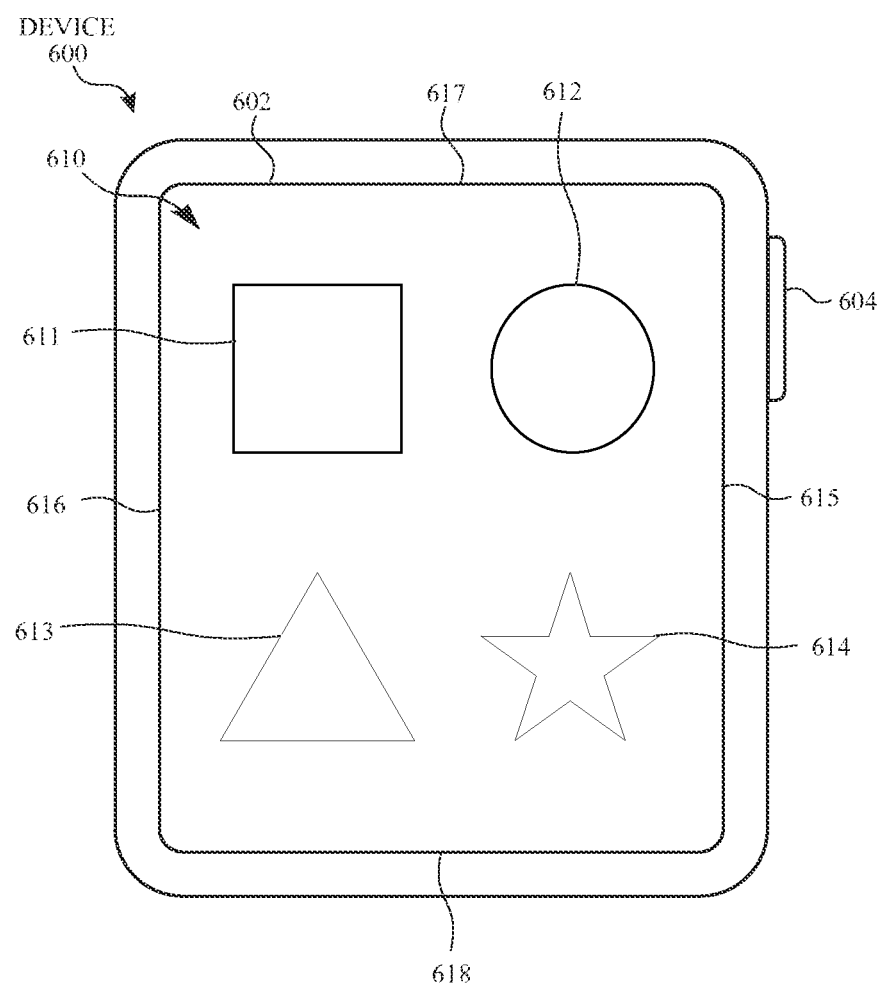
FIG. 6 illustrates an exemplary user interface that includes displayed content in accordance with some embodiments.

Various exemplary techniques for displaying and navigating (e.g., zooming and translating) content on a user interface of an electronic device using a rotatable input mechanism are described below. FIG. 6 shows an exemplary electronic device 600. In some embodiments, device 600 may be one or more of devices 100 (FIG. 1), 300 (FIG. 3), and/or 500 (FIG. 5). For purposes of illustration, device 600 is a personal electronic device with a touch-sensitive display 602 and a rotatable input mechanism 604.

In FIG. 6, personal electronic device 600 displays content 610 on display 602. In some embodiments, content 610 includes a graphical user interface for an application, a home screen, a photo, a video, a menu of user interface objects, a document, etc. In FIG. 6, content 610 includes user interface objects 611-614. In some embodiments, content 610 includes a background, wallpaper, or the like. Content 600 includes a right edge 615 adjacent to the right boundary of the display, a left edge 616 opposite the right edge and adjacent to the left boundary of the display, a top edge 617 adjacent to the top boundary of the display and perpendicular to the left edge 616 and right edge 615, and a bottom edge 618 opposite the top edge 617 adjacent to the bottom boundary of the display and perpendicular to the left edge 616 and right edge 615.

It should be recognized that the terms "top edge," "bottom edge," "right edge," and "left edge" have been chosen for purposes of clarity and are used in relation to the orientations of the specific exemplary embodiments depicted in the figures. A person having ordinary skill in the art would recognize that a top edge in some embodiments may correspond to a right, left, or bottom edge in other embodiments, and so forth.

FIGS. 7A-7B illustrate an exemplary technique for enlarging the display of the content 610 displayed on personal electronic device 600. A person having ordinary skill in the art would recognize that enlarging the display of the content 610 may also be referred to as zooming or magnifying the display of content 610. Personal electronic device 600 can detect a first user input. The first user input may include any user input capable of being detected by personal electronic device 600. In the example shown in FIG. 7A, the user input is a touch 705 on the touch-sensitive display. In some embodiments, touch 705 includes a two-finger double tap gesture.

In response to detecting the first user input, personal electronic device 600 displays an enlarged view of content 610. FIG. 7B illustrates an exemplary enlarged view 710 that includes portions of user interface objects 611 and 612. In some embodiments, enlarged view 710 does not include the right edge 615 or the left edge 616 of content 610.

In some embodiments, the enlarged view of the content is centered on a location associated with the first user input. In FIG. 7B, the enlarged view 710 is centered on a location of the contact made by touch 705, which is between user interface objects 611 and 612, as seen in FIG. 7A. In embodiments in which the first user input includes a two-finger touch gesture, the enlarged view may be centered on a determined centroid of the two fingers. In some embodiments, the enlarged view of the content includes a predetermined area of the content. For example, the enlarged view may include the top left corner of the content or the center of the displayed content.

In some embodiments, the magnification of the enlarged view is predetermined by, for example, an operation system setting, parameter, or the like. In some embodiments, the magnification level is persistent. In other words, the magnification of the enlarged view may be determined by a previous level of magnification displayed by personal electronic device 600, such as the last time a view of content was enlarged. Optionally, the magnification of the enlarged view may be adjusted. In some embodiments, the magnification is adjustable by a user input (e.g., a two-finger drag gesture on the touch-sensitive display or a touch combined with a rotation of the rotatable input mechanism as described in greater detail below with reference to FIGS. 10A-10B).

Figure 8F:
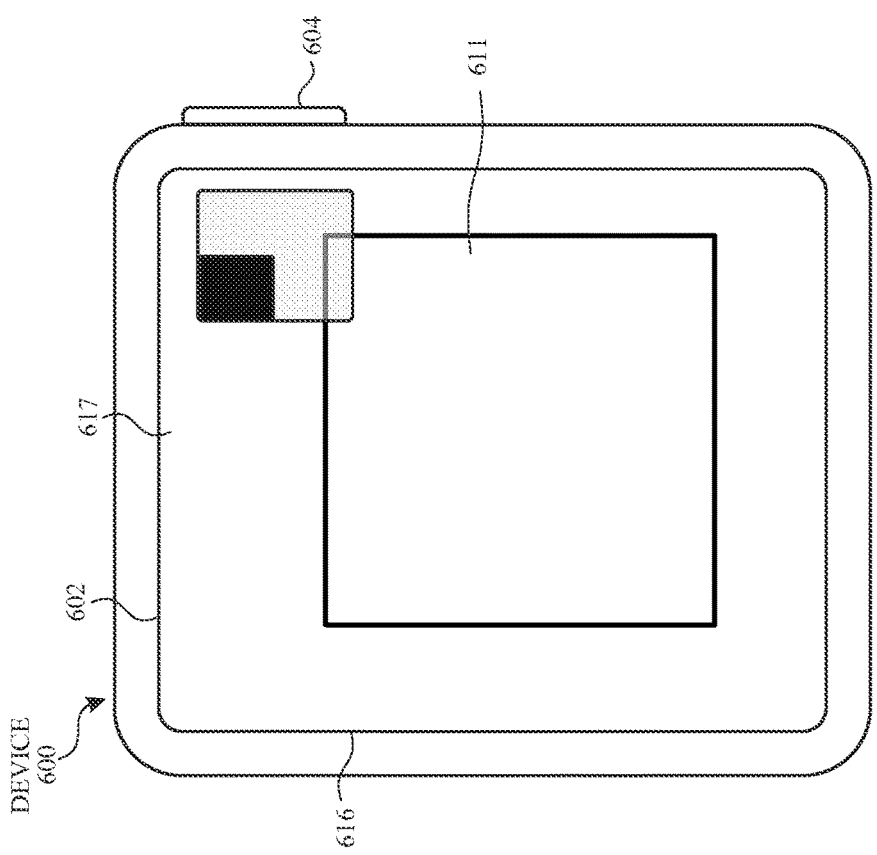

FIGS. 8A-8F illustrate an exemplary technique for a user to view content 610 while it is displayed in the enlarged view 710. FIG. 8A shows personal electronic device 600 displaying the enlarged view shown in FIG. 7B. Arrow 805 indicates a rotation of rotatable input mechanism 604 in a first rotation direction. The first rotation direction may be counterclockwise or counterclockwise. Personal electronic device 600 can detect rotation 805 and, in response to detecting the rotation 805, translate the enlarged view of the content in a first translation direction on the display indicated by arrow 810. In the current example, it should be recognized that arrow 810 (and other arrows representing translation directions discussed below) is not displayed on display 602, and is included in the figures merely for purposes of explanation. The enlarged view may be translated to display the first edge 615 of the content 610. For example, the enlarged view may be translated horizontally from left to right on the display 602 until the view reaches the right edge 615 of the content 610, as illustrated in FIG. 8B. The enlarged view may be translated continuously or in discrete steps in response to the rotation 805 to display an enlarged view of any portion of content 610 between the view shown in FIG. 8A and the view shown in FIG. 8B.

In some embodiments, personal electronic device 600 displays a user interface object that provides an indication of which portion of the content is being displayed in the enlarged view. FIG. 8A illustrates an exemplary indicator 850 that provides an indication of the relative size and location of the portion of content 610 displayed in the enlarged view compared to the non-enlarged view (e.g., the entire content 610). In some embodiments, the indication 850 is displayed in response to rotation of the rotatable input mechanism 604 (e.g., rotation 805). In some embodiments, the indication 850 is displayed in response to the first user input (e.g., touch 705) upon initial display of the enlarged view. In some embodiment, indication 850 is displayed in response to an input that adjusts the magnification of the enlarged view, examples of which will be discussed in greater detail below. In some embodiments, the indication 850 may be removed (e.g., by fading out) after a predetermined amount of time of inactivity of the rotatable input mechanism 604 after a rotational input.

In some embodiments, indication 850 includes a first user interface object and a second user interface object, where the first user interface object is overlaid on the enlarged view of the content and the second user interface object is overlaid on the first user interface object. Exemplary indicator 850 has a translucent user interface object 852 that represents the size and shape of the content 610. Indicator 850 further includes an opaque user interface object 854 within user interface object 852 that indicates the size and location of the portion of the content currently displayed in the enlarged view. The size and location of the enlarged view is represented by the size and location of user interface object 854 compared to user interface object 852. For example, indicator 850 in FIG. 8A indicates that the enlarged view contains a portion of content 610 along the top edge 617 and that the enlarged view shows about a quarter of content 610. Furthermore, the indicator 850 changes as the enlarged view is translated to reflect the current position and size of the enlarged view. As seen in FIG. 8B, for example, the opaque user interface object 854 occupies the top right corner of user interface object 852 to indicate that the enlarged view shows the top right corner of content 610.

In some embodiments, the rotatable input mechanism 604 is located adjacent to a portion of the touch-sensitive display 602 and the indication 850 is displayed adjacent to the rotatable input mechanism 604, as illustrated, for example, in FIG. 8A. Placement of the indication 850 adjacent to the rotatable input mechanism 604 provides a visual indication of the relationship between the rotatable input mechanism 604 and translation of the enlarged view.

Once the right edge 615 of content 610 is reached as shown in FIG. 8B, personal electronic device 600 may detect further rotation of the rotatable input mechanism 604 in the first rotation direction (i.e., the same direction), represented by arrow 815. In response to detecting further rotation 815, personal electronic device 600 translates the enlarged view of content 610 in a second translation direction 820 on the display 602. In some embodiments, in response to detecting further rotation 815 of the rotatable input mechanism 604 in the first rotation direction, translation of the enlarged view is paused before translating the enlarged view in the second direction (e.g., once the right edge 615 of the content 610 is displayed, translation is paused before beginning to translate the enlarged view in direction 820). In some embodiments, a determination is made whether the translation has reached an edge of the content (e.g., the right edge 615 or the left edge 616). In accordance with a determination that the translation has reached an edge, translation of the enlarged view is paused in response to further rotation of the rotatable input mechanism in the first rotation direction. Alternatively, in accordance with a determination that the translation has not reached an edge of the content, translation of the enlarged view is continued in the same translation direction in response to further rotation of the rotatable input mechanism in the first rotation direction. Pausing the translation may have the advantageous technical effect of indicating to the user that an edge of the content has been reached. This may provide context to the user when the entire content is not viewable, as in the case of the enlarged view.

In response to detecting further rotation 815, the enlarged view may be translated in direction 820 to display a second edge of content 610. FIGS. 8C-8D illustrate an example of translation in second direction 820, where the enlarged view is translated diagonally downward and to the left from the right edge 615 of the content (e.g., the first edge) until a lower portion of the left edge 616 (e.g., the second edge) of content 602 is displayed. A person of ordinary skill in the art would recognize that diagonally refers to motion having both a horizontal as well as vertical component, but does not require those components to be equal. Notably, the further rotation 815 of the rotatable input mechanism 604 in the same rotation direction causes translation of the enlarged view in a different direction than the previous rotation 805. That is, rotation of the rotatable input mechanism 604 in a single rotation direction can result in translation of the enlarged view in different directions on display 602 depending on the location of the view currently being displayed.

Figure 8E:
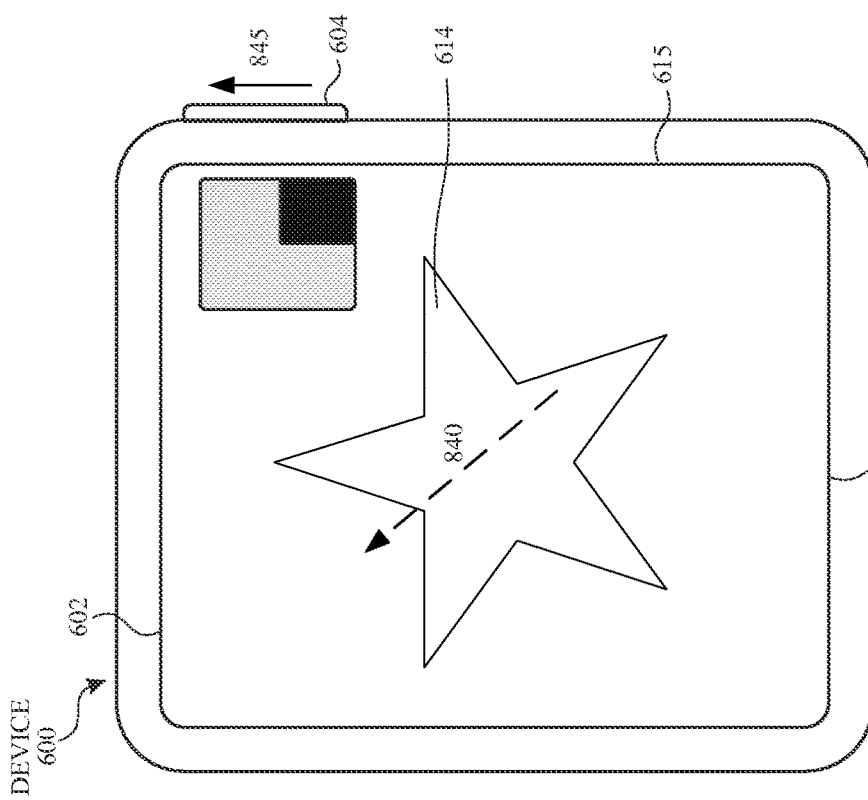

Once the left edge 616 of content 610 is displayed, further rotation 835 of the rotatable input mechanism 604 in the first rotation direction may cause the enlarged view to be translated horizontally in direction 830 along a path vertically displaced from the previous horizontal path. For example, in response to further rotation 835 of the rotatable input mechanism 604 in the first rotation direction, the enlarged view is translated horizontally from the lower left corner of the content 610 defined by left edge 616 and lower edge 618 to the lower right corner of the content defined by lower edge 618 and right edge 615, as illustrated by FIGS. 8D-8E.

Once the enlarged view has reached the bottom right corner of the content 610, further rotation 845 of the rotatable input mechanism 604 in the first rotation direction may cause the enlarged view to be translated in direction 840 to the top left corner of the content defined by left edge 616 and top edge 617. In some embodiments, translating the enlarged view includes determining whether the translation has reached a first corner of the content (e.g., the bottom right corner) defined by the first edge (e.g., the right edge 615) and a third edge perpendicular to the first edge (e.g., the bottom edge 618). In accordance with a determination that the translation has reached the first corner, the enlarged view is translated toward a second corner of the content (e.g., the top left corner) defined by the second edge (e.g., the left edge 616) and a fourth edge perpendicular to the second edge (e.g., the top edge 617). In some embodiments, the second corner is diagonally opposite from the first corner. FIGS. 8E-8F illustrate an exemplary translation according to this technique in which the enlarged view is translated diagonally from the bottom right corner of the content 610 to the diagonally opposite top left corner. Alternatively, in accordance with a determination that the translation has not reached the first corner of the content, the enlarged view may continue to be translated in the same direction (e.g., direction 830).

Figure 8G:
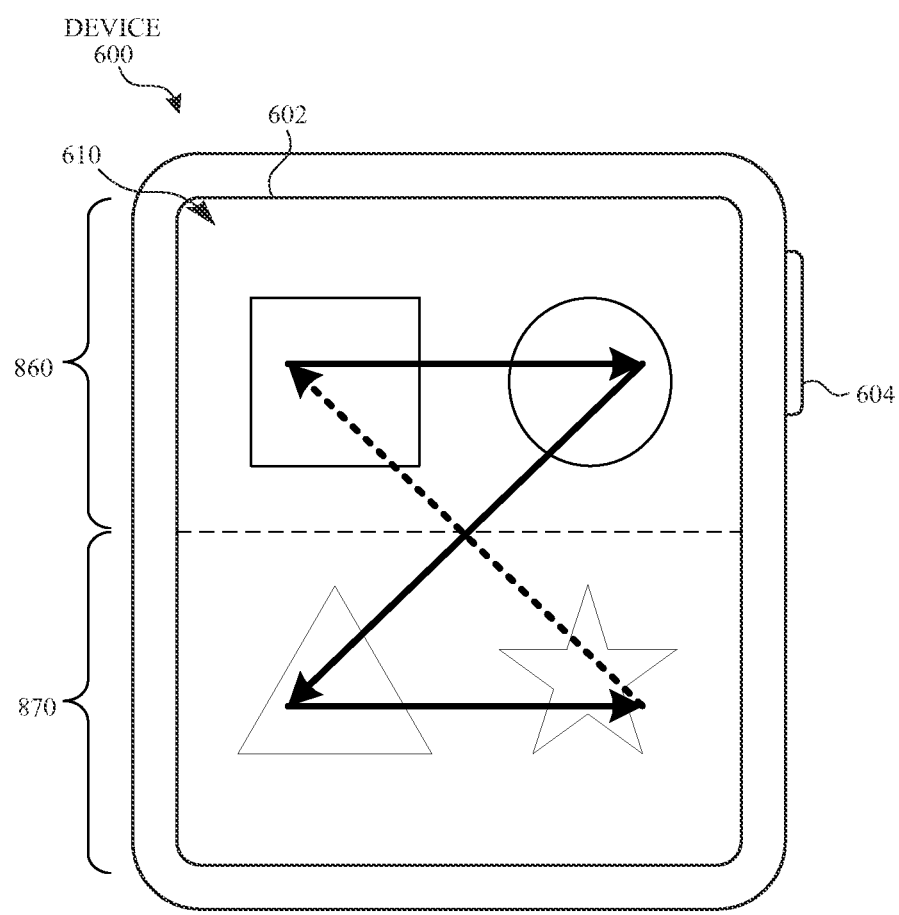

The path of translation of the enlarged view according to the techniques described above with respect to FIGS. 8A-8F is depicted in FIG. 8G. The path is overlaid on a non-enlarged view of content 610 for the purposes of illustration. The arrows in FIG. 8G represent the entire round-trip path of the center of the enlarged view in response to rotation in a first rotation direction. In the embodiment illustrated in FIGS. 8A-8G, rotation of the rotatable input mechanism 604 in the first rotation direction causes the enlarged view to be translated horizontally from left to right until the right edge 615 of the content 610 is displayed, and then diagonally downward and to the left until the left edge 616 is displayed. In some embodiments, rotation of the rotatable input mechanism 604 in a second rotation direction causes the enlarged view to be translated along the same path, but in the opposite direction. That is, in response to rotation of the rotatable input mechanism in a second rotation direction, the enlarged view may be translated horizontally from right to left until the left edge 616 of the content is displayed, and then diagonally upward and to the right until the right edge 615 is displayed. In some embodiments, the second rotation direction is in a direction opposite the first rotation direction.

In the example illustrated in FIGS. 8A-8D, the enlarged view is translated from a first portion of the content, such as that shown in FIG. 8A, to a second portion of the content, such as that shown in FIG. 8D, where the second portion of the content is displaced vertically on the display from the first portion. In FIGS. 8A-8B, the enlarged view translates along a horizontal portion of the content, which may be thought of logically as a row. One of ordinary skill in the art would understand, however, that the displayed content, or the enlarged view thereof, does not necessarily include an indication of the horizontal portions or rows, and that the concept of rows may be used merely to define the paths or directions along which the enlarged view is translated.

Figure 9A:
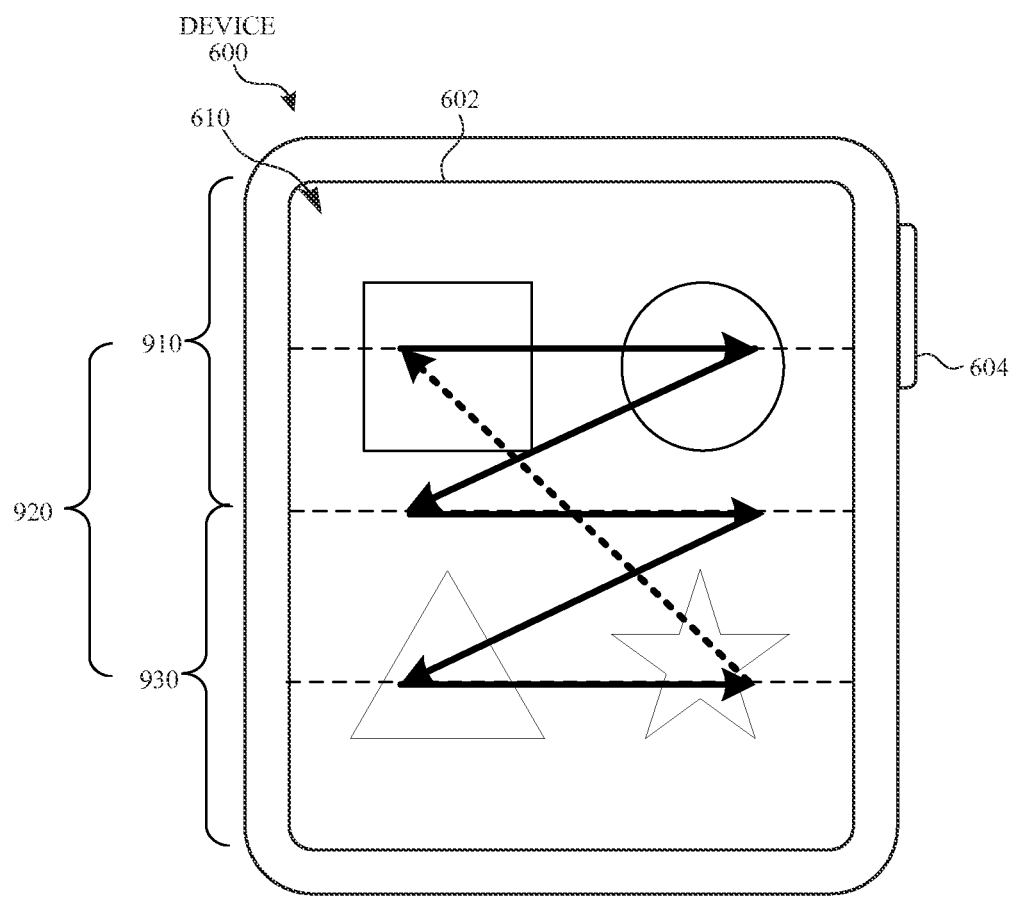

In the embodiment depicted by FIGS. 8A-8G, the magnification and path of the enlarged view define two hypothetical rows 860 and 870. Each row occupies approximately 50 percent of the vertical extent of content 610, and row 860 does not overlap row 870. In some embodiments, the horizontal portions defined by the path along which the enlarged view is translated at least partially overlap. That is, adjacent rows of the content may overlap. FIG. 9A illustrates an alternative path in which the enlarged view is translated such that adjacent rows overlap. The rows may overlap by any amount. In the embodiment illustrated in FIG. 9A, the size and path of the enlarged view define three rows 910, 920, and 930. Each row occupies approximately 50 percent of the vertical extent of the content, and each row overlaps approximately 50 percent of one or more adjacent rows.

FIG. 9B illustrates an exemplary enlarged view 950 that includes the left edge 616 in upper row 910 along top edge 617. According to the scheme in FIG. 9A, in response to rotation 905 of rotatable input mechanism 604, the enlarged view is translated to the right across upper row 910 to right edge 615 and then diagonally to the left side of middle row 920. FIG. 9C illustrates an exemplary enlarged view 960 of the left side of middle row 920. As can be seen, the portion of content 610 displayed in enlarged view 960 overlaps the portion of content 610 displayed in enlarged view 950. The lower portion of view 950 shows the same portion of content 610 as the upper portion of view 960. For example, the bottom portion of user interface object 611 can be seen in both views. Since the entire content 610 is not displayed in an enlarged view, causing adjacent rows to overlap may provide the user with context of where the portion being viewed relative to the content as a whole.

In some embodiments, diagonal translation is performed at a faster rate than horizontal translation. For example, a given amount of rotation of the rotatable input mechanism 604 may cause the enlarged view to be translated a certain amount in the horizontal direction (e.g., direction 810 or 830), whereas the same amount of rotation may cause a greater amount of translation along a diagonal direction (e.g., direction 820 or 840). Accordingly, diagonal translation may appear to occur faster than horizontal translation.

That is, translating the enlarged view may include determining whether the enlarged view is to be translated horizontally or diagonally. In accordance with a determination that the enlarged view is to be translated horizontally, the translation is performed at a first speed, and in accordance with a determination that the enlarged view is to be translated diagonally, the translation is performed at a second speed that is greater than the first speed.

Exemplary techniques will now be described for causing the display to be transitioned back to a non-enlarged view of content 610. In some embodiments, a third user input is detected while the enlarged view is being displayed. In response to detecting the third user input, the content is displayed as it was immediately prior to detection of the user input that caused the enlarged view to be displayed. In some embodiments, the type of user input that causes the display to revert back to its initial state is the same as the user input that causes personal electronic device 600 to display the enlarged view (e.g., touch 705 or a two-finger double tap while the enlarged view is being displayed). For example, while an enlarged view of the content is being displayed (e.g., enlarged view 710), personal electronic device 600 may detect the third user input. In response to detecting the third user input, personal electronic device 600 may replace the display of the enlarged view (e.g., enlarged view 710) with a display of a non-enlarged view of the content (e.g., the view of content 610 displayed in FIG. 6).

In some embodiments, while displaying an enlarged view of content, personal electronic device 600 performs different operations in response rotation of the rotatable input mechanism 604 depending on the operational state of the device. For example, personal electronic device 600 may operate in a first state in which rotation of the rotatable input mechanism 604 causes the enlarged view to be translated according to the techniques described above. Personal electronic device 600 may, alternatively, operate in a second operational state in which it performs a second operation that is different from the first operation in response to rotation of the rotatable input mechanism 604 while an enlarged view is displayed. For example, personal electronic device 600 may respond to a rotation of the rotatable input mechanism 604 by scrolling through a list of potentially selectable user interface objects or translating the content vertically. In some embodiments, while in the second operational state and displaying an enlarged view of content 610, personal electronic device 600 performs whatever operation it is configured to perform were it not displaying an enlarged view of the content (i.e., as if the content were not enlarged). That is, personal electronic device performs the same operation on the enlarged view of content 610 as it would if content 610 were not enlarged.

A user may switch between the first operational state and the second operational state by performing a user input while the enlarged view is displayed. That is, in response to detecting a fourth user input and (e.g., a two-finger single tap), the personal electronic device 600 is changed from a first operational state to a second operational state, where in the first operational state, rotation of the rotatable input mechanism 604 performs a first operation, and in the second state, rotation of the rotatable input mechanism 604 performs a second operation that is different than the first operation. In some embodiments, the operational state is persistent in the sense that upon displaying the enlarged view of the content, personal electronic device 600 is set to operate in the same state as when an enlarged view was last displayed.

In some embodiments, the rotatable input mechanism 604 can be used in combination with another input to adjust the magnification of the enlarged view. That is, while displaying the enlarged view of the content, a user input and a rotation of the rotatable input mechanism 604 can be detected. In response to detecting the user input and the rotation of the rotatable input mechanism 604, the magnification of the enlarged view is adjusted.

FIGS. 10A-10B illustrate an embodiment in which the magnification of the enlarged view is adjusted in response to detecting a touch 1005 on the touch-sensitive display 602 and a rotation 1010 of the rotatable input mechanism 604. In some embodiments, the touch 1005 and at least a portion of the rotation 1010 are detected essentially simultaneously. The touch 1005 may be, for example, a tap and hold gesture of a single finger. In the exemplary embodiment illustrated in FIGS. 10A-10B, in response to touch 1005 and rotation 1010 of the rotatable input mechanism 604 in a first rotation direction, magnification of the enlarged view is increased. In some embodiments, the enlarged view stays centered on the same location of content 610 as it is magnified. Indicator 850 in FIG. 10B shows that as the enlarged view is magnified, less of the content is displayed (i.e., the size of user interface object 854 is reduced) and the same location of content 610 remains at the center of display 602. In some embodiments, the magnification may be decreased in response to detecting touch 1005 and a rotation in a rotation direction opposite of the direction of rotation 1010.

In some embodiments, a non-transitory computer-readable storage medium stores one or more programs comprising instructions, which when executed by one or more processors of an electronic device with a display and a rotatable input mechanism, cause the device to perform any of the techniques described above.

Figure 11:
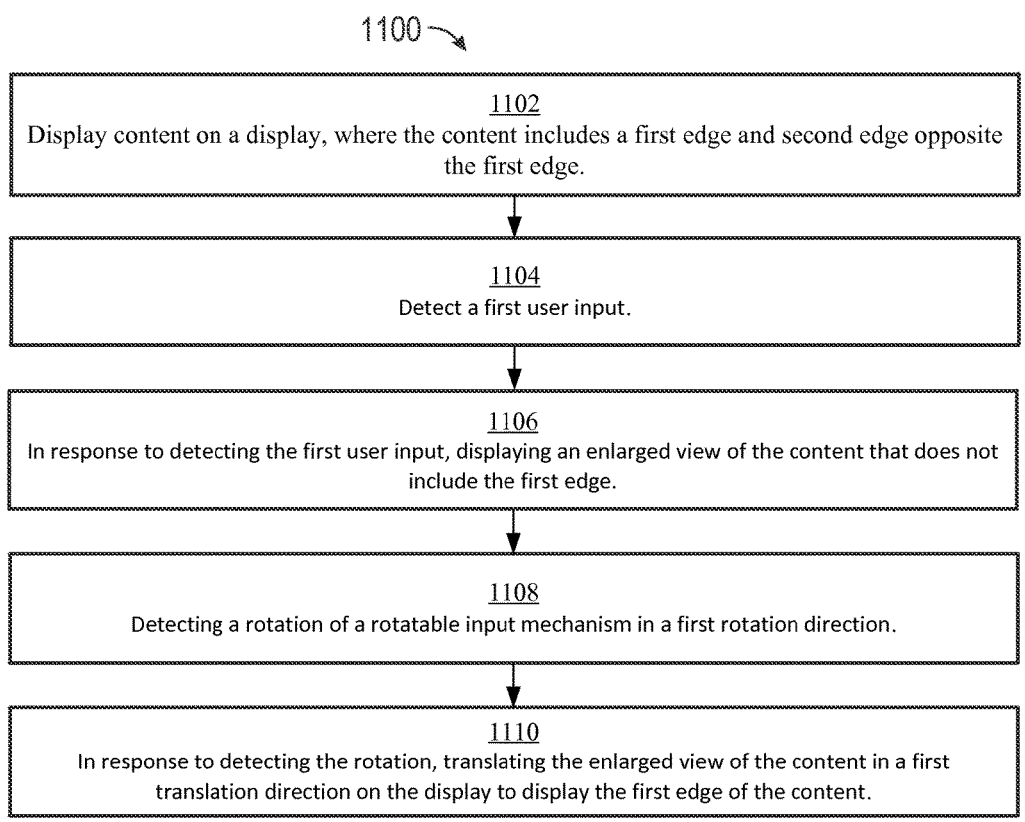
FIG. 11 is a flow diagram illustrating a process for displaying content in accordance with some embodiments.

FIG. 11 is a flow diagram illustrating a method for 1100 using an electronic device in accordance with some embodiments. Method 1100 is performed at a device (e.g., 100, 300, 500) with a display, a rotatable input mechanism, and, optionally, a touch-sensitive surface. Some operations in method 1100 may be combined, the order of some operations may be changed, and some operations may be omitted.

As described below, method 1100 provides an intuitive way for enlarging the view of displayed content and viewing the enlarged view. The method reduces the cognitive burden on a user for enlarging the view of displayed content and viewing the enlarged view, thereby creating a more efficient human-machine interface. For battery-operated computing devices, enabling a user to enlarge the view of displayed content and view the enlarged view faster and more efficiently conserves power and increases the time between battery charges.

At block 1102, content is displayed on the display, where the content includes a first edge and a second edge opposite the first edge.

At block 1104, a first user input is detected.

At block 1106, an enlarged view of the content is displayed in response to the first user input. The enlarged view of the content does not include the first edge.

At block 1108, a rotation of the rotatable input mechanism in a first rotation direction is detected.

At block 1110, in response to detecting the rotation of the rotatable input mechanism, the enlarged view of the content is translated in a first translation direction on the display to display the first edge of the content.

Figure 12:
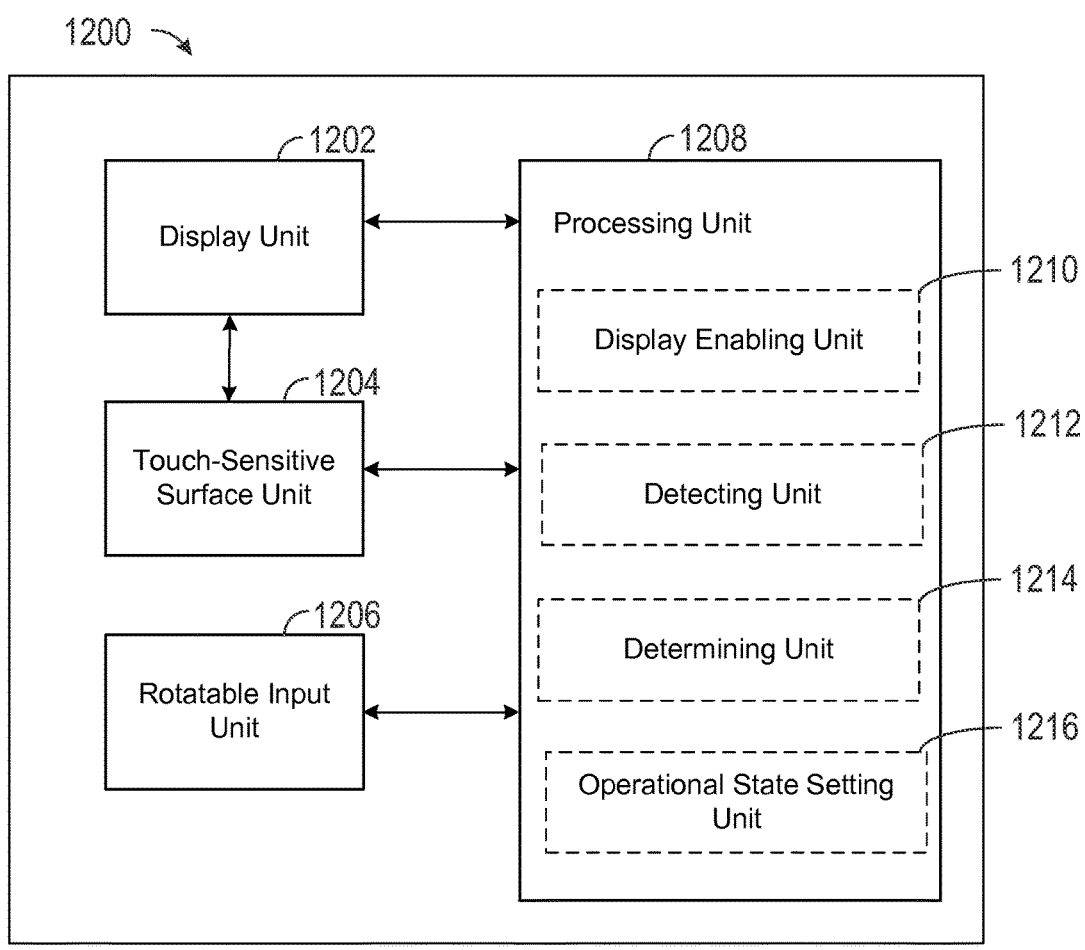
FIG. 12 is a functional block diagram of an electronic device in accordance with some embodiments.

In accordance with some embodiments, FIG. 12 shows an exemplary functional block diagram of an electronic device 1200 configured in accordance with the principles of the various described embodiments. In accordance with some embodiments, the functional blocks of electronic device 1200 are configured to perform the techniques described above. The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

As shown in FIG. 12, an electronic device 1200 includes a display unit 1202 configured to display a graphic user interface, optionally, a touch-sensitive surface unit 1204 configured to receive contacts, a rotatable input unit 1206, and a processing unit 1208 coupled to the display unit 1202, the rotatable input unit 1206, and, optionally, the touch-sensitive surface unit 1204. In some embodiments, the processing unit 1208 optionally includes a display enabling unit 1210, a detecting unit 1212, a determining unit 1214, and an operational state setting unit 1216.

The processing unit 1208 is configured to: enable (e.g., with display enabling unit 1210) display of content on the display unit, where the content includes a first edge and a second edge opposite the first edge; detect (e.g., with detecting unit 1212) a first user input; in response to detecting the first user input, enable (e.g., with display enabling unit 1210) display of an enlarged view of the content that does not include the first edge; detect (e.g., with detecting unit 1212) a rotation of the rotatable input unit in a first rotation direction; and in response to detecting the rotation, enable (e.g., with display enabling unit 1210) translation of the enlarged view of the content in a first translation direction on the display unit to display the first edge of the content.

In some embodiments, processing unit 1208 is further configured to detect (e.g., with detecting unit 1212) further rotation of the rotatable input unit in the first rotation direction and, in response to detecting the further rotation, enable (e.g., with display enabling unit 1210) translation of the enlarged view in a second translation direction on the display to display the second edge of the content, where the second translation direction is different than the first translation direction.

In some embodiments, the first user input includes a two-finger double tap on the touch-sensitive surface unit. In some embodiments, the enlarged view of the content is centered on a location associated with the first user input. In some embodiments, the enlarged view of the content includes a predetermined area of the content. In some embodiments, the first translation direction is horizontal and the second translation direction is diagonal.

In some embodiments, processing unit 1208 is further configured to, further in response to detecting the further rotation, and before translating the enlarged view in the second direction, enable (e.g., with display enabling unit 1210) pausing of translation of the enlarged view. In some embodiments, processing unit 1208 is further configured to: determine (e.g., with determining unit 1214) whether the translation has reached the first edge of the content or the second edge of the content; in accordance with a determination that the translation has reached the first edge of the content or the second edge of the content, enable (e.g., with display enabling unit 1210) pausing of translation of the enlarged view in response to further rotation of the rotatable input unit in the first rotation direction; and in accordance with a determination that the translation has not reached the first edge of the content or the second edge of the content, enable (e.g., with display enabling unit 1210) continuing translation of the enlarged view in the same translation direction in response to further rotation of the rotatable input unit in the first rotation direction.

In some embodiments, the enlarged view is translated from a first portion of the content to a second portion of the content, where the second portion of the content is displaced vertically from the first portion. In some embodiments, the first portion and the second portion at least partially overlap.

In some embodiments, rotation of the rotatable input unit in the first rotation direction causes the enlarged view to be translated horizontally from left to right or diagonally downward and to the left, and rotation of the rotatable input unit in a second rotation direction, opposite the first rotation direction, causes the enlarged view to be translated horizontally from right to left or diagonally upward and to the right.

In some embodiments, enabling translation of the enlarged view includes: determining whether the translation has reached a first corner of the content defined by the first edge and a third edge perpendicular to the first edge; in accordance with a determination that the translation has reached the first corner, enabling (e.g., with display enabling unit 1210) translation of the enlarged view toward a second corner of the content defined by the second edge and a fourth edge perpendicular to the second edge, where the second corner is diagonally opposite from the first corner; and in accordance with a determination that the translation has not reached the first corner of the content, enabling (e.g., with display enabling unit 1210) continuing translation of the enlarged view in the same direction. In some embodiments, the first corner is a bottom right corner of the content and the second corner is an upper left corner of the content.

In some embodiments, enabling translation of the enlarged view includes: determining whether the enlarged view is to be translated horizontally or diagonally; in accordance with a determination that the enlarged view is to be translated horizontally, enabling (e.g., with display enabling unit 1210) translation at a first speed; in accordance with a determination that the enlarged view is to be translated diagonally, enabling translation at a second speed that is greater than the first speed.

In some embodiments, displaying the enlarged view of the content includes displaying a first portion of the content, and the processing unit 1208 is further configured to: in response to rotation of the rotatable input unit in the first rotation direction, enable (e.g., with display enabling unit 1210) display of an indication of the size and location of the first portion of the content relative to the entire content. In some embodiments, the indication includes a first user interface object and a second user interface object, where the first user interface object is overlaid on the first portion of the content and the second user interface object is overlaid on the first user interface object. In some embodiments, the size and location of the second user interface object relative to the first user interface object indicates the size and location of the first portion relative to the entire content. In some embodiments, the first user interface object is translucent and the second user interface object is opaque. In some embodiments, the rotatable input unit is located adjacent to a portion of the display unit and the indication is displayed adjacent to the rotatable input unit.

In some embodiments, processing unit 1208 is further configured to: detect (e.g., with detecting unit 1212) a third user input; and in response to detecting the third user input, enable (e.g., with display enabling unit 1210) display of the content as it was displayed immediately prior to detecting the first user input.

In some embodiments, processing unit 1208 is further configured to: detect (e.g., with detecting unit 1212) a fourth user input; and in response to detecting the fourth user input, change (e.g., with operational state setting unit 1216) the electronic device from a first operational state to a second operational state, where: in the first operational state, rotation of the rotatable input unit performs a first operation, and in the second state, rotation of the rotatable input unit performs a second operation that is different than the first operation.

In some embodiments, processing unit 1208 is further configured to: while the enlarged view of the content is displayed, detect (e.g., with detecting unit 1212) a fifth user input and detecting a second rotation of the rotatable input unit; and in response to detecting the fifth user input and the second rotation of the rotatable input unit, enable (e.g., with display enabling unit 1210) adjustment of the magnification of the enlarged view. In some embodiments, the fifth user input is a touch on the touch-sensitive surface unit. In some embodiments, the touch and at least a portion of the second rotation are detected essentially simultaneously. In some embodiments, in accordance with the second rotation being in a first rotation direction, the magnification is increased; and in accordance with the second rotation being in a second rotation direction, the magnification is decreased.

The operations described above with reference to FIG. 11 are, optionally, implemented by components depicted in FIGS. 1A-1B or FIG. 12. For example, displaying operations 1102 and 1106, detecting operations 1104 and 1108, and translating operation 1110 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by one or more processors of an electronic device with a touch-sensitive display and a rotatable input mechanism, cause the electronic device to:
   display content on the display, wherein the content includes a first edge and a second edge opposite the first edge;
   detect a first user input;
   in response to detecting the first user input, display an enlarged view of the content, wherein displaying the enlarged view of the content includes displaying a portion of the content without displaying the first edge of the content on the display;
   detect a rotation of the rotatable input mechanism in a first rotation direction;
   in response to detecting the rotation, translate the enlarged view of the content in a first translation direction on the display to display the first edge of the enlarged view of the content;
   detect further rotation of the rotatable input mechanism in the first rotation direction; and
   in response to detecting the further rotation, translate the enlarged view in a second translation direction on the display to display the second edge of the enlarged view of the content, wherein the second translation direction is different than the first translation direction.

2. The non-transitory computer-readable storage medium of claim 1, wherein the first user input includes a two-finger double tap on the touch-sensitive display.

3. The non-transitory computer-readable storage medium of claim 1, wherein the enlarged view of the content is centered on a location associated with the first user input.

4. The non-transitory computer-readable storage medium of claim 1, wherein the first translation direction is horizontal and the second translation direction is diagonal.

5. The non-transitory computer-readable storage medium of claim 1, wherein the one or more programs further comprises instructions, which when executed by the one or more processors of the electronic device, cause the electronic device to:
   further in response to detecting the further rotation, and before translating the enlarged view in the second direction, pause translation of the enlarged view.

6. The non-transitory computer-readable storage medium of claim 1, wherein the one or more programs further comprises instructions, which when executed by the one or more processors of the electronic device, cause the electronic device to:
   determine whether the translation has reached the first edge of the content or the second edge of the content;
   in accordance with a determination that the translation has reached the first edge of the content or the second edge of the content, pause translation of the enlarged view in response to further rotation of the rotatable input mechanism in the first rotation direction; and
   in accordance with a determination that the translation has not reached the first edge of the content or the second edge of the content, continue translation of the enlarged view in the same translation direction in response to further rotation of the rotatable input mechanism in the first rotation direction.

7. The non-transitory computer-readable storage medium of claim 1, wherein the enlarged view is translated from a first portion of the content to a second portion of the content, and wherein the second portion of the content is displaced vertically from the first portion.

8. The non-transitory computer-readable storage medium of claim 1, wherein rotation of the rotatable input mechanism in the first rotation direction causes the enlarged view to be translated horizontally from left to right or diagonally downward and to the left, and
wherein rotation of the rotatable input mechanism in a second rotation direction, opposite the first rotation direction, causes the enlarged view to be translated horizontally from right to left or diagonally upward and to the right.

9. The non-transitory computer-readable storage medium of claim 1, wherein translating the enlarged view includes:
determining whether the translation has reached a first corner of the content defined by the first edge and a third edge perpendicular to the first edge;
in accordance with a determination that the translation has reached the first corner, translating the enlarged view toward a second corner of the content defined by the second edge and a fourth edge perpendicular to the second edge, wherein the second corner is diagonally opposite from the first corner; and
in accordance with a determination that the translation has not reached the first corner of the content, continuing to translate the enlarged view in the same direction.

10. The non-transitory computer-readable storage medium of claim 1, wherein translating the enlarged view includes:
determining whether the enlarged view is to be translated horizontally or diagonally;
in accordance with a determination that the enlarged view is to be translated horizontally, performing the translation at a first speed; and
in accordance with a determination that the enlarged view is to be translated diagonally, performing the translation at a second speed that is greater than the first speed.

11. The non-transitory computer-readable storage medium of claim 1, wherein displaying the enlarged view of the content includes displaying a third portion of the content, and wherein the one or more programs further comprises instructions, which when executed by the one or more processors of the electronic device, cause the electronic device to:
in response to rotation of the rotatable input mechanism in the first rotation direction, display an indication of the size and location of the third portion of the content relative to the entire content.

12. The non-transitory computer-readable storage medium of claim 11, wherein the indication includes a first user interface object and a second user interface object, and wherein the first user interface object is overlaid on the enlarged view of the content and the second user interface object is overlaid on the first user interface object.

13. The non-transitory computer-readable storage medium of claim 12, wherein the size and location of the second user interface object relative to the first user interface object indicates the size and location of the third portion relative to the entire content.

14. The non-transitory computer-readable storage medium of claim 11, wherein the rotatable input mechanism is located adjacent to a portion of the touch-sensitive display and the indication is displayed adjacent to the rotatable input mechanism.

15. The non-transitory computer-readable storage medium of claim 1, wherein the one or more programs further comprises instructions, which when executed by the one or more processors of the electronic device, cause the electronic device to:
detect a third user input; and
in response to detecting the third user input, display the content as it was displayed immediately prior to detecting the first user input.

16. The non-transitory computer-readable storage medium of claim 1, wherein the one or more programs further comprises instructions, which when executed by the one or more processors of the electronic device, cause the electronic device to:
detect a fourth user input; and
in response to detecting the fourth user input, change the electronic device from a first operational state to a second operational state, wherein:
in the first operational state, rotation of the rotatable input mechanism performs a first operation, and
in the second state, rotation of the rotatable input mechanism performs a second operation that is different than the first operation.

17. The non-transitory computer-readable storage medium of claim 1, wherein the one or more programs further comprises instructions, which when executed by the one or more processors of the electronic device, cause the electronic device to:
while displaying the enlarged view of the content, detect a fifth user input and detecting a second rotation of the rotatable input mechanism; and
in response to detecting the fifth user input and the second rotation of the rotatable input mechanism, adjust the magnification of the enlarged view.

18. The non-transitory computer-readable storage medium of claim 17, wherein the fifth user input is a touch on the touch-sensitive display.

19. The non-transitory computer-readable storage medium of claim 17, wherein:
in accordance with the second rotation being in a first rotation direction, the magnification is increased; and
in accordance with the second rotation being in a second rotation direction, the magnification is decreased.

20. The non-transitory computer-readable storage medium of claim 1, wherein the portion of the content is a fourth portion of the content,
wherein translating the enlarged view of the content in the first translation direction on the display to display the first edge of the content includes translating the enlarged view of the content in the first translation direction on the display to display a fifth portion of the content that includes the first edge of the content,
wherein translating the enlarged view in the second translation direction on the display to display the second edge of the content includes translating the enlarged view in the second translation direction on the display to display a sixth portion of the content that includes the second edge of the content, and
wherein the sixth portion of the content is different from the fourth portion of the content and the fifth portion of the content.

21. A method, comprising:
at an electronic device with a touch-sensitive display, a rotatable input mechanism, one or more processors, and memory:
displaying content on the display, wherein the content includes a first edge and a second edge opposite the first edge;
detecting a first user input;
in response to detecting the first user input, displaying an enlarged view of the content, wherein displaying the enlarged view of the content includes displaying a portion of the content without displaying the first edge of the content on the display;
detecting a rotation of the rotatable input mechanism in a first rotation direction;
in response to detecting the rotation, translating the enlarged view of the content in a first translation direction on the display to display the first edge of the enlarged view of the content;
detecting further rotation of the rotatable input mechanism in the first rotation direction; and
in response to detecting the further rotation, translating the enlarged view in a second translation direction on the display to display the second edge of the enlarged view of the content, wherein the second translation direction is different than the first translation direction.

22. The method of claim 21, wherein the first user input includes a two-finger double tap on the touch-sensitive display.

23. The method of claim 21, wherein the enlarged view of the content is centered on a location associated with the first user input.

24. The method of claim 21, wherein the first translation direction is horizontal and the second translation direction is diagonal.

25. The method of claim 21, further comprising:
further in response to detecting the further rotation, and before translating the enlarged view in the second direction, pausing translation of the enlarged view.

26. The method of claim 21, further comprising:
determining whether the translation has reached the first edge of the content or the second edge of the content;
in accordance with a determination that the translation has reached the first edge of the content or the second edge of the content, pausing translation of the enlarged view in response to further rotation of the rotatable input mechanism in the first rotation direction; and
in accordance with a determination that the translation has not reached the first edge of the content or the second edge of the content, continuing translation of the enlarged view in the same translation direction in response to further rotation of the rotatable input mechanism in the first rotation direction.

27. The method of claim 21, wherein the enlarged view is translated from a first portion of the content to a second portion of the content, and wherein the second portion of the content is displaced vertically from the first portion.

28. The method of claim 21, wherein rotation of the rotatable input mechanism in the first rotation direction causes the enlarged view to be translated horizontally from left to right or diagonally downward and to the left, and wherein rotation of the rotatable input mechanism in a second rotation direction, opposite the first rotation direction, causes the enlarged view to be translated horizontally from right to left or diagonally upward and to the right.

29. The method of claim 21, wherein translating the enlarged view includes:
determining whether the translation has reached a first corner of the content defined by the first edge and a third edge perpendicular to the first edge;
in accordance with a determination that the translation has reached the first corner, translating the enlarged view toward a second corner of the content defined by the second edge and a fourth edge perpendicular to the second edge, wherein the second corner is diagonally opposite from the first corner; and
in accordance with a determination that the translation has not reached the first corner of the content, continuing to translate the enlarged view in the same direction.

30. The method of claim 21, wherein translating the enlarged view includes:
determining whether the enlarged view is to be translated horizontally or diagonally;
in accordance with a determination that the enlarged view is to be translated horizontally, performing the translation at a first speed; and
in accordance with a determination that the enlarged view is to be translated diagonally, performing the translation at a second speed that is greater than the first speed.

31. The method of claim 21, wherein displaying the enlarged view of the content includes displaying a third portion of the content, and wherein the method further comprises:
in response to rotation of the rotatable input mechanism in the first rotation direction, displaying an indication of the size and location of the third portion of the content relative to the entire content.

32. The method of claim 31, wherein the indication includes a first user interface object and a second user interface object, and wherein the first user interface object is overlaid on the enlarged view of the content and the second user interface object is overlaid on the first user interface object.

33. The method of claim 32, wherein the size and location of the second user interface object relative to the first user interface object indicates the size and location of the third portion relative to the entire content.

34. The method of claim 31, wherein the rotatable input mechanism is located adjacent to a portion of the touch-sensitive display and the indication is displayed adjacent to the rotatable input mechanism.

35. The method of claim 21, further comprising:
detecting a third user input; and
in response to detecting the third user input, displaying the content as it was displayed immediately prior to detecting the first user input.

36. The method of claim 21, further comprising:
detecting a fourth user input; and
in response to detecting the fourth user input, changing the method from a first operational state to a second operational state, wherein:
in the first operational state, rotation of the rotatable input mechanism performs a first operation, and
in the second state, rotation of the rotatable input mechanism performs a second operation that is different than the first operation.

37. The method of claim 21, further comprising:
while displaying the enlarged view of the content, detecting a fifth user input and detecting a second rotation of the rotatable input mechanism; and in response to detecting the fifth user input and the second rotation of the rotatable input mechanism, adjusting the magnification of the enlarged view.

38. The method of claim 37, wherein the fifth user input is a touch on the touch-sensitive display.

39. The method of claim 37, wherein:
in accordance with the second rotation being in a first rotation direction, the magnification is increased; and
in accordance with the second rotation being in a second rotation direction, the magnification is decreased.

40. The method of claim 21, wherein the portion of the content is a fourth portion of the content,
wherein translating the enlarged view of the content in the first translation direction on the display to display the first edge of the content includes translating the enlarged view of the content in the first translation direction on the display to display a fifth portion of the content that includes the first edge of the content,
wherein translating the enlarged view in the second translation direction on the display to display the second edge of the content includes translating the enlarged view in the second translation direction on the display to display a sixth portion of the content that includes the second edge of the content, and
wherein the sixth portion of the content is different from the fourth portion of the content and the fifth portion of the content.

41. An electronic device, comprising:
a display;
a rotatable input mechanism;
one or more processors;
a memory; and
one or more programs, wherein the one or more programs are stored in the memory and configured to be executed by the one or more processors, the one or more programs including instructions for:
displaying content on the display, wherein the content includes a first edge and a second edge opposite the first edge;
detecting a first user input;
in response to detecting the first user input, displaying an enlarged view of the content, wherein displaying the enlarged view of the content includes displaying a portion of the content without displaying the first edge of the content on the display;
detecting a rotation of the rotatable input mechanism in a first rotation direction;
in response to detecting the rotation, translating the enlarged view of the content in a first translation direction on the display to display the first edge of the enlarged view of the content;
detecting further rotation of the rotatable input mechanism in the first rotation direction; and
in response to detecting the further rotation, translating the enlarged view in a second translation direction on the display to display the second edge of the enlarged view of the content, wherein the second translation direction is different than the first translation direction.

42. The electronic device of claim 41, wherein the first user input includes a two-finger double tap on the touch-sensitive display.

43. The electronic device of claim 41, wherein the enlarged view of the content is centered on a location associated with the first user input.

44. The electronic device of claim 41, wherein the first translation direction is horizontal and the second translation direction is diagonal.

45. The electronic device of claim 41, the one or more programs further including instructions for:
further in response to detecting the further rotation, and before translating the enlarged view in the second direction, pausing translation of the enlarged view.

46. The electronic device of claim 41, the one or more programs further including instructions for:
determining whether the translation has reached the first edge of the content or the second edge of the content;
in accordance with a determination that the translation has reached the first edge of the content or the second edge of the content, pausing translation of the enlarged view in response to further rotation of the rotatable input mechanism in the first rotation direction; and
in accordance with a determination that the translation has not reached the first edge of the content or the second edge of the content, continuing translation of the enlarged view in the same translation direction in response to further rotation of the rotatable input mechanism in the first rotation direction.

47. The electronic device of claim 41, wherein the enlarged view is translated from a first portion of the content to a second portion of the content, and wherein the second portion of the content is displaced vertically from the first portion.

48. The electronic device of claim 41, wherein rotation of the rotatable input mechanism in the first rotation direction causes the enlarged view to be translated horizontally from left to right or diagonally downward and to the left, and
wherein rotation of the rotatable input mechanism in a second rotation direction, opposite the first rotation direction, causes the enlarged view to be translated horizontally from right to left or diagonally upward and to the right.

49. The electronic device of claim 41, wherein translating the enlarged view includes:
determining whether the translation has reached a first corner of the content defined by the first edge and a third edge perpendicular to the first edge;
in accordance with a determination that the translation has reached the first corner, translating the enlarged view toward a second corner of the content defined by the second edge and a fourth edge perpendicular to the second edge, wherein the second corner is diagonally opposite from the first corner; and
in accordance with a determination that the translation has not reached the first corner of the content, continuing to translate the enlarged view in the same direction.

50. The electronic device of claim 41, wherein translating the enlarged view includes:
determining whether the enlarged view is to be translated horizontally or diagonally;
in accordance with a determination that the enlarged view is to be translated horizontally, performing the translation at a first speed; and
in accordance with a determination that the enlarged view is to be translated diagonally, performing the translation at a second speed that is greater than the first speed.

51. The electronic device of claim 41, wherein displaying the enlarged view of the content includes displaying a third portion of the content, and wherein the one or more programs further includes instructions:
in response to rotation of the rotatable input mechanism in the first rotation direction, displaying an indication of the size and location of the third portion of the content relative to the entire content.

52. The electronic device of claim 51, wherein the indication includes a first user interface object and a second user interface object, and wherein the first user interface object is overlaid on the enlarged view of the content and the second user interface object is overlaid on the first user interface object.

53. The electronic device of claim 52, wherein the size and location of the second user interface object relative to the first user interface object indicates the size and location of the third portion relative to the entire content.

54. The electronic device of claim 51, wherein the rotatable input mechanism is located adjacent to a portion of the touch-sensitive display and the indication is displayed adjacent to the rotatable input mechanism.

55. The electronic device of claim 41, the one or more programs further including instructions for:
  detecting a third user input; and
  in response to detecting the third user input, displaying the content as it was displayed immediately prior to detecting the first user input.

56. The electronic device of claim 41, the one or more programs further including instructions for:
  detecting a fourth user input; and
  in response to detecting the fourth user input, changing the electronic device from a first operational state to a second operational state, wherein:
    in the first operational state, rotation of the rotatable input mechanism performs a first operation, and
    in the second state, rotation of the rotatable input mechanism performs a second operation that is different than the first operation.

57. The electronic device of claim 41, the one or more programs further including instructions for:
  while displaying the enlarged view of the content, detecting a fifth user input and detecting a second rotation of the rotatable input mechanism; and
  in response to detecting the fifth user input and the second rotation of the rotatable input mechanism, adjusting the magnification of the enlarged view.

58. The electronic device of claim 57, wherein the fifth user input is a touch on the touch-sensitive display.

59. The electronic device of claim 57, wherein:
  in accordance with the second rotation being in a first rotation direction, the magnification is increased; and
  in accordance with the second rotation being in a second rotation direction, the magnification is decreased.

60. The electronic device of claim 41, wherein the portion of the content is a fourth portion of the content,
  wherein translating the enlarged view of the content in the first translation direction on the display to display the first edge of the content includes translating the enlarged view of the content in the first translation direction on the display to display a fifth portion of the content that includes the first edge of the content,
  wherein translating the enlarged view in the second translation direction on the display to display the second edge of the content includes translating the enlarged view in the second translation direction on the display to display a sixth portion of the content that includes the second edge of the content, and
  wherein the sixth portion of the content is different from the fourth portion of the content and the fifth portion of the content.

\* \* \* \* \*